(12) United States Patent
Jung et al.

(10) Patent No.: US 9,801,089 B2
(45) Date of Patent: *Oct. 24, 2017

(54) METHOD FOR REPORTING THE RESULTS OF SPECIFIC REFERENCE-CELL-BASED QUALITY MEASUREMENT IN A MOBILE COMMUNICATION SYSTEM USING CARRIER AGGREGATION, AND APPARATUS FOR THE METHOD

(71) Applicant: LG ELECTRONICS INC., Seoul (KR)

(72) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/845,716

(22) Filed: Sep. 4, 2015

(65) Prior Publication Data

US 2015/0382226 A1    Dec. 31, 2015

Related U.S. Application Data

(63) Continuation of application No. 14/492,907, filed on Sep. 22, 2014, now Pat. No. 9,161,271, which is a
(Continued)

(51) Int. Cl.
*H04L 12/28* (2006.01)
*H04W 24/10* (2009.01)
(Continued)

(52) U.S. Cl.
CPC .......... *H04W 24/10* (2013.01); *H04W 24/08* (2013.01); *H04W 36/0083* (2013.01);
(Continued)

(58) Field of Classification Search
CPC ...... H04L 5/001; H04W 24/08; H04W 24/10; H04W 36/0083; H04W 72/042; H04W 76/025; H04W 88/06
See application file for complete search history.

(56) References Cited

U.S. PATENT DOCUMENTS 7,924,702 B2    4/2011    Kulkarni et al.
7,948,922 B2    5/2011    Pang et al.
(Continued)

FOREIGN PATENT DOCUMENTS

EP    1720373    8/2006
EP    2262301    12/2010
(Continued)

OTHER PUBLICATIONS

Motorola, "Control Signalling Design for Supporting Carrier Aggregation", R1-090792, 3GPP TSG RAN1 #56, Feb. 2009, 8 pages.
(Continued)

*Primary Examiner* — Khaled Kassim
*Assistant Examiner* — Berhanu Belete
(74) *Attorney, Agent, or Firm* — Lee, Hong, Degerman, Kang & Waimey

(57) ABSTRACT

The present invention relates to a method in which a terminal reports the results of quality measurement based on a specific reference cell from among a plurality of serving cells for the terminal in a mobile communication system using carrier aggregation. The present invention also relates to a terminal apparatus for the method. For this purpose, the terminal receives measurement configuration information
(Continued)

from a network, performs a quality measurement in accordance with the received measurement configuration information, determines whether or not a report criterion based on a specific reference cell from among the plurality of cells for the terminal is met in accordance with the measurement result, and, if the report criterion based on the specific reference cell is met, sends a report message, including the measurement results and an indicator that indicates the specific reference cell, to the network.

13 Claims, 16 Drawing Sheets

Related U.S. Application Data continuation of application No. 13/574,595, filed as application No. PCT/KR2011/000410 on Jan. 20, 2011, now Pat. No. 8,891,394.

(60) Provisional application No. 61/297,227, filed on Jan. 21, 2010.

(51) Int. Cl.
*H04W 36/00* (2009.01)
*H04W 24/08* (2009.01)
*H04W 72/04* (2009.01)
*H04W 76/02* (2009.01)
*H04L 5/00* (2006.01)
*H04W 88/06* (2009.01)

(52) U.S. Cl.
CPC ....... *H04W 72/042* (2013.01); *H04W 76/025* (2013.01); *H04L 5/001* (2013.01); *H04W 88/06* (2013.01)

(56) References Cited

U.S. PATENT DOCUMENTS

| 8,472,407 | B2 | 6/2013 | Iwamura et al. | |
|---|---|---|---|---|
| 8,582,467 | B2 | 11/2013 | Hirota et al. | |
| 2007/0086361 | A1 | 4/2007 | Allan et al. | |
| 2008/0214198 | A1* | 9/2008 | Chen | H04L 1/0026 455/450 |
| 2008/0268833 | A1 | 10/2008 | Huang et al. | |
| 2009/0036116 | A1 | 2/2009 | Kim et al. | |
| 2009/0047960 | A1 | 2/2009 | Gunnarsson et al. | |
| 2009/0047968 | A1 | 2/2009 | Gunnarsson et al. | |
| 2009/0197606 | A1 | 8/2009 | Bergman et al. | |
| 2009/0247150 | A1* | 10/2009 | Fischer | H04W 24/10 455/425 |
| 2009/0325501 | A1* | 12/2009 | Somasundaram | H04W 36/30 455/67.11 |
| 2010/0075675 | A1 | 3/2010 | Yang et al. | |
| 2010/0120431 | A1 | 5/2010 | Hwang et al. | |
| 2010/0178922 | A1* | 7/2010 | Han | H04W 36/245 455/436 |
| 2010/0190487 | A1 | 7/2010 | Wang et al. | |
| 2011/0076999 | A1* | 3/2011 | Kazmi | H04W 24/10 455/423 |
| 2011/0080895 | A1* | 4/2011 | Iwamura | H04W 36/0083 370/332 |
| 2011/0096692 | A1 | 4/2011 | Liu et al. | |
| 2011/0098042 | A1 | 4/2011 | Mach et al. | |
| 2011/0105123 | A1* | 5/2011 | Lee | H04W 24/10 455/436 |
| 2011/0170418 | A1* | 7/2011 | Sagfors | H04W 36/0083 370/241 |
| 2011/0176440 | A1 | 7/2011 | Frank et al. | |
| 2011/0269449 | A1* | 11/2011 | Kazmi | H04B 7/024 455/422.1 |
| 2011/0300871 | A1 | 12/2011 | Dottling et al. | |
| 2012/0003943 | A1* | 1/2012 | Marinier | H04W 36/0083 455/73 |
| 2012/0014267 | A1 | 1/2012 | Gomes et al. | |
| 2012/0064886 | A1 | 3/2012 | Kim et al. | |
| 2012/0094608 | A1 | 4/2012 | Shi et al. | |
| 2012/0147856 | A1* | 6/2012 | Kazmi | H04W 24/10 370/332 |
| 2012/0244903 | A1 | 9/2012 | Fong et al. | |
| 2012/0258718 | A1* | 10/2012 | Whinnett | H04W 36/04 455/437 |
| 2012/0300657 | A1 | 11/2012 | Jung et al. | |
| 2012/0329460 | A1* | 12/2012 | Huang | H04B 7/024 455/436 |
| 2013/0244662 | A1 | 9/2013 | Wager et al. | |

FOREIGN PATENT DOCUMENTS

| KR | 10-2009-0129448 | 12/2009 |
|---|---|---|
| WO | 2008053302 | 5/2008 |
| WO | 2009/119595 | 10/2009 |
| WO | 2009119595 | 10/2009 |

OTHER PUBLICATIONS

U.S. Appl. No. 13/522,945, Office Action dated Mar. 17, 2014, 18 pages.
PCT International Application No. PCT/KR2011/000436, International Search Report dated Sep. 26, 2011, 2 pages.
European Patent Office Application Serial No. 11734891.2, Search Report dated Sep. 13, 2016, 7 pages.

* cited by examiner

METHOD FOR REPORTING THE RESULTS OF SPECIFIC REFERENCE-CELL-BASED QUALITY MEASUREMENT IN A MOBILE COMMUNICATION SYSTEM USING CARRIER AGGREGATION, AND APPARATUS FOR THE METHOD

CROSS-REFERENCE TO RELATED APPLICATIONS

This application a continuation of U.S. patent application Ser. No. 14/492,907, filed on Sep. 22, 2014, now U.S. Pat. No. 9,161,271, which is a continuation of U.S. patent application Ser. No. 13/574,595, filed on Jul. 20, 2012, now U.S. Pat. No. 8,891,394, which is the National Stage filing under 35 U.S.C. 371 of International Application No. PCT/KR2011/000410, filed on Jan. 20, 2011, which claims the benefit of U.S. Provisional Application No. 61/297,227, filed on Jan. 21, 2010, the contents of which are all hereby incorporated by reference herein in their entirety.

TECHNICAL FIELD

The present invention relates to a method for allowing a user equipment (UE) to perform a quality measurement report on the basis of a specific reference cell from among a plurality of serving cells contained in the UE in a mobile communication system based on carrier aggregation, and a UE apparatus for the method.

BACKGROUND ART

It is necessary for the mobile communication system to support UE mobility. In order to support UE mobility, the UE persistently measures not only the quality of a serving cell that currently provides a service but also the quality of a neighbor cell of the serving cell. The UE transmits the measurement result to the network at an appropriate time, and the network transmits a handover (HO) command and the like to the UE on the basis of the measurement result value reported by the UE and provides optimum mobility to the UE.

In order to support UE mobility as well as to provide information that is helpful to enterprise network management, the UE may perform a measurement procedure having a specific purpose established in the network or may report the measurement result to the network. For example, the UE receives broadcast information of a specific cell decided by the network. The UE may report a cell identity (also called a global cell ID) of the specific cell, location identification information (e.g., a tracking area code) of the specific cell, and/or other cell information (e.g., indicating a member or non-member of a Closed Subscriber Group (CSG) cell to a serving cell.

If the moving UE confirms a poor quality of a specific region through measurement, and may report location information and cell-quality measurement results of poor-quality cells to the network. The network may optimize the network on the basis of the cell-quality measurement result of UEs assisting network management. In a mobile communication system having a frequency reuse factor of 1, mobility is mostly performed between different cells in the same band. Therefore, in order to guarantee UE mobility, the UE has to accurately measure not only a quality of each neighbor cell having the same intermediate frequency as that of the serving cell, but also each cell information. In this way, measurement of a cell that has the same intermediate frequency as that of the serving cell is referred to as intra-frequency measurement. The UE performs intra-frequency measurement, and reports the cell quality measurement result to the network at an appropriate time, such that the quality measurement result of the corresponding cell can be achieved.

A mobile communication enterprise may operate and manage a network using a plurality of frequency bands. In order to guarantee optimum UE mobility under the condition that a service of the communication system is provided through multiple frequency bands, the UE has to measure not only the quality of each neighbor cell having an intermediate frequency different from that of the serving cell but also each piece of cell information. Likewise, measurement of a cell having an intermediate frequency different from that of the serving cell is referred to as inter-frequency measurement. The UE performs inter-frequency measurement such that it has to report the cell quality measurement result to the network at an appropriate time.

If the UE supports measurement of a heterogeneous network, it may measure the heterogeneous cell according to BS or eNB setting. Heterogeneous network measurement is referred to as inter-RAT (inter—Radio Access Technology) measurement. For example, RAT may include UTRAN (UMTS Terrestrial Radio Access Network) and (GSM EDGE Radio Access Network (GERAN) that are based on the 3GPP standard specification. If necessary, the RAT may further include a CDMA 200 system based on the 3GPP2 standard specification.

DISCLOSURE

Technical Problem

If a predetermined measurement report reference is satisfied upon completion of intra-frequency measurement, inter-frequency measurement and inter-RAT measurement, the UE may report the measurement result to the network. In this case, a conventional measurement report reference is mainly based on a quality value of a serving cell of the UE. However, differently from the related art in which only one serving cell can be configured in the UE, assuming that a plurality of serving cells can be simultaneously configured in the UE, it is not preferable that the UE may use only the fixed serving cell as a reference for quality estimation. On the contrary, it may be preferable that the UE may dynamically change a reference cell to be used as an estimation reference of the quality measurement result according to the purpose of measurement or a UE situation.

In order to meet the above-mentioned demand, the present invention is directed to a method for allowing a UE to efficiently perform measurement report on the basis of a specific reference cell from among a plurality of serving cells configured in the UE, and a UE apparatus for the method.

Technical Solution

The object of the present invention can be achieved by providing a method for performing, by a user equipment (UE), a quality measurement report on the basis of a specific reference cell in a mobile communication system using a carrier aggregation (CA) scheme, the method comprising receiving measurement configuration information from a network; performing, by the user equipment (UE), quality measurement according to the received measurement configuration information; determining whether a quality measurement report criterion is satisfied on the basis of a specific reference cell from among a plurality of cells configured in the user equipment (UE) based upon quality measurement result; and reporting a report message including the quality measurement result and an indicator indicating the specific reference cell to the network if the quality measurement report criterion is satisfied on the basis of the specific reference cell.

The user equipment (UE) selects the specific reference cell according to any one scheme predetermined between the user equipment (UE) and the network from among a first scheme for selecting a cell having the highest quality from among a plurality of cells configured in the UE, a second scheme for selecting a cell having the lowest quality from among a plurality of cells configured in the UE, and a third scheme for allowing the UE to randomly select one of a plurality of cells configured in the UE.

The received measurement configuration information includes information regarding the scheme for enabling the UE to select the specific reference cell from among the plurality of cells configured in the user equipment (UE). The scheme for selecting the specific reference cell includes at least one of the first scheme for selecting one cell having the highest quality from among the plurality of cells configured in the UE, the second scheme for selecting one cell having the lowest quality from among the plurality of cells configured in the UE, and the third scheme for allowing the UE to randomly select one of a plurality of cells configured in the UE.

The received measurement configuration information includes information regarding the quality measurement report criterion. The quality measurement report criterion includes at least one of a first criterion (1) in which a quality of a serving cell is better than a threshold value, a second criterion (2) in which the quality of the serving cell is worse than a threshold value, a third criterion (3) in which a quality of a neighbor cell is higher than the quality of the serving cell by a measurement offset or higher, a fourth criterion (4) in which the quality of the serving cell is worse than a first threshold value and the quality of the neighbor cell is better than a second threshold value, and a fifth criterion (5) in which the serving cell quality is worse than the first threshold value and a neighbor cell quality of an heterogeneous network (inter—Radio Access Technology) is better than a second threshold value, wherein the user equipment (UE) considers the serving cell for use in the first to fifth criteria (1) to (5) to be a specific reference cell so as to determine whether the first to fifth criteria (1) to (5) were satisfied.

The method may further include, upon receiving the measurement configuration information, determining whether a plurality of serving cells are configured in the UE. If the plurality of serving cells are configured in the user equipment (UE), the quality measurement operation and the operation of determining whether the quality measurement report criterion is satisfied are carried out.

In another aspect of the present invention, a method for performing, by a user equipment (UE), a quality measurement report on the basis of a specific reference cell in a mobile communication system are a carrier aggregation (CA) scheme includes receiving measurement configuration information from a network, wherein the measurement configuration information includes a measurement object, a quality measurement report criterion, a measurement identity for connecting the measurement object to the quality measurement report criterion, and an identifier which indicates a specific reference cell to be used for determining whether the quality measurement report criterion is satisfied from among a plurality of cells configured in the user equipment (UE); performing, by the user equipment (UE), quality measurement according to the received measurement configuration information; determining whether a quality measurement report criterion is satisfied on the basis of the specific reference cell based upon quality measurement result; and reporting a report message including the quality measurement result to the network if the quality measurement report criterion is satisfied on the basis of the specific reference cell.

In another aspect of the present invention, a user equipment (UE) for performing a quality measurement report on the basis of a specific reference cell in a mobile communication system using a carrier aggregation (CA) scheme includes a reception module configured to receive measurement configuration information from a network; and a processor configured to control a quality measurement operation in response to the measurement configuration information received through the reception module, wherein the processor, if a quality measurement report criterion is satisfied on the basis of a specific reference cell from among a plurality of cells configured in the user equipment (UE) upon receiving the quality measurement result, reports a report message including the quality measurement result and an indicator indicating the specific reference cell to the network.

The processor selects the specific reference serving cell according to any one scheme predetermined between the user equipment (UE) and the network from among a first scheme for selecting a cell having the highest quality from among a plurality of cells configured in the UE, a second scheme for selecting a cell having the lowest quality from among a plurality of cells configured in the UE, and a third scheme for allowing the UE to randomly select one of a plurality of cells configured in the UE.

In another aspect of the present invention, a user equipment (UE) for performing a quality measurement report on the basis of a specific reference cell in a mobile communication system using a carrier aggregation (CA) scheme includes a reception module configured to receive measurement configuration information from a network, wherein the measurement configuration information includes a measurement object, a quality measurement report criterion, a measurement identity for connecting the measurement object to the quality measurement report criterion, and an identifier which indicates a specific reference cell to be used for determining whether the quality measurement report criterion is satisfied from among a plurality of cells configured in the user equipment (UE); and a processor configured to control a quality measurement operation in response to the measurement configuration information received through the reception module, wherein the processor, if the quality measurement report criterion is satisfied on the basis of the specific reference cell upon receiving the quality measurement result, reports a report message including the quality measurement result to the network.

Advantageous Effects

The above-mentioned embodiments can allow a UE to efficiently select a reference cell to be used for estimating a measurement value for a quality measurement report in a mobile communication system based on carrier aggregation, such that the UE can share the quality measurement result value with the eNode B (eNB) without any problems.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. For example, although the following description assumes a 3GPP LTE based system as an example of a mobile communication system, it may have a wide variety of applications as a method for performing efficient measurement in various mobile communication systems to which a carrier aggregation technique may be applied, such as an IEEE 802.16 based system.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

In the following description, "measurement" may be defined as measuring a quality value of the corresponding cell after receiving reference signals from inter-frequency cells, intra-frequency cells, and inter-RAT cells according to a measurement setting signal transferred from the network to the UE. In the following description, the term "quality" indicates a signal quality or cell quality recognized through a reference signal received from a cell serving as a measurement target.

A method for performing quality measurement report on the basis of a specific reference cell from among a plurality of serving cells configured in a UE in a mobile communication system based on carrier aggregation (CA) technology and a UE device for the method will hereinafter be described with reference to the annexed drawings. As a representative example of a wireless communication system of the present invention, a $3^{rd}$ Generation Partnership Project Long Term Evolution (3GPP LTE) communication system will hereinafter be described in detail.

Figure 1:
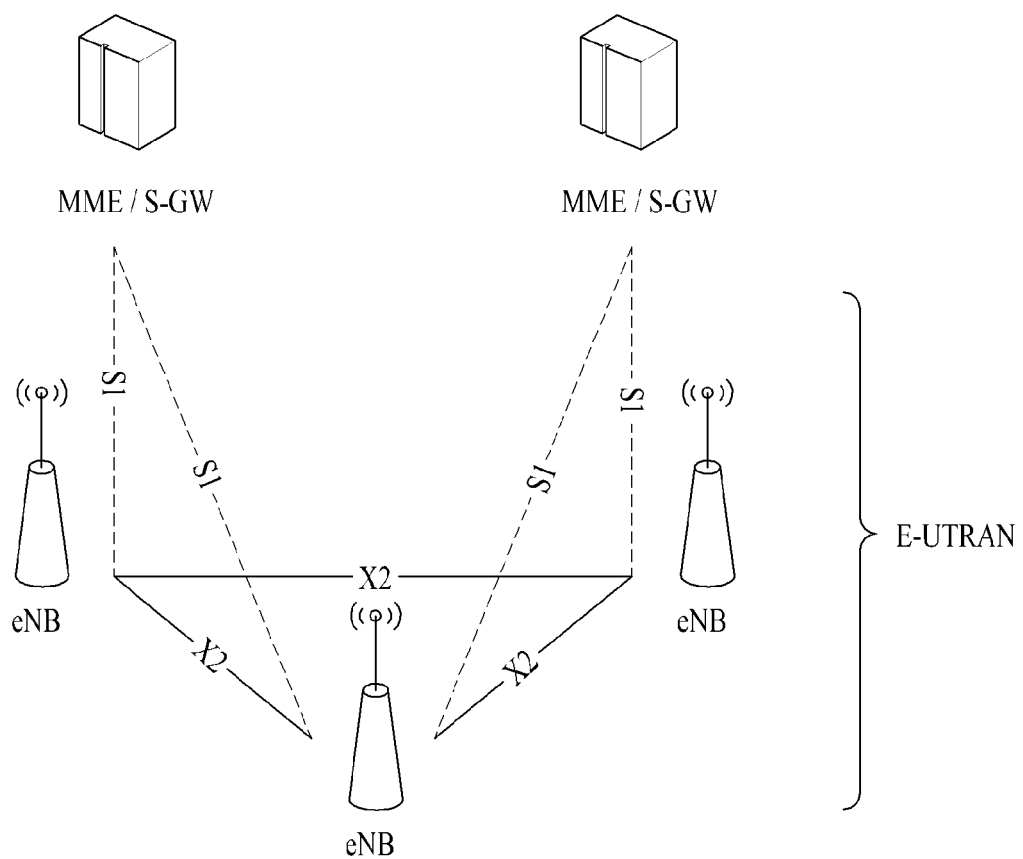
FIG. 1 is a conceptual diagram illustrating an Evolved Universal Terrestrial Radio Access Network (E-UTRAN) structure as an example of a mobile communication system.

FIG. 1 is a conceptual diagram illustrating an Evolved Universal Terrestrial Radio Access Network (E-UTRAN) structure as an example of a mobile communication system. The E-UTRAN system is an evolved version of the conventional UTRAN system, and basic standardization thereof is now being conducted by the 3rd Generation Partnership Project (3GPP). E-UMTS may also be referred to as Long Term Evolution (LTE).

The E-UTRAN includes one or more cells that will also be referred to as "eNode B(s)" or "eNB(s)". The eNBs are connected through an X2 interface. Each eNB is connected to the User Equipment (UE) through a radio interface and is connected to an Evolved Packet Core (EPC) through an S1 interface.

The EPC may include a Mobility Management Entity (MME), a Serving-Gateway (S-GW), and a Packet Data Network-Gateway (PDN-GW). The MME may include UE access information or UE capability information, and this information is generally adapted to manage UE mobility. The S-GW is a gateway in which the E-UTRAN is located at an end point, and the PDN-GW is a gateway in which a Packet Data Network (PDN) is located at an end point.

Radio interface protocol layers between the UE and the network are classified into a first layer (L1), a second layer (L2), and a third layer (L3) on the basis of three lower layers of an Open System Interconnection (OSI) reference model well known in the field of communication systems. The first layer (L1) provides an information transfer service using a physical channel. A radio resource control (RRC) layer located at the third layer (L3) controls radio resources between the UE and the network. For this operation, the RRC layer exchanges the RRC message between the UE and the network.

Figure 2:
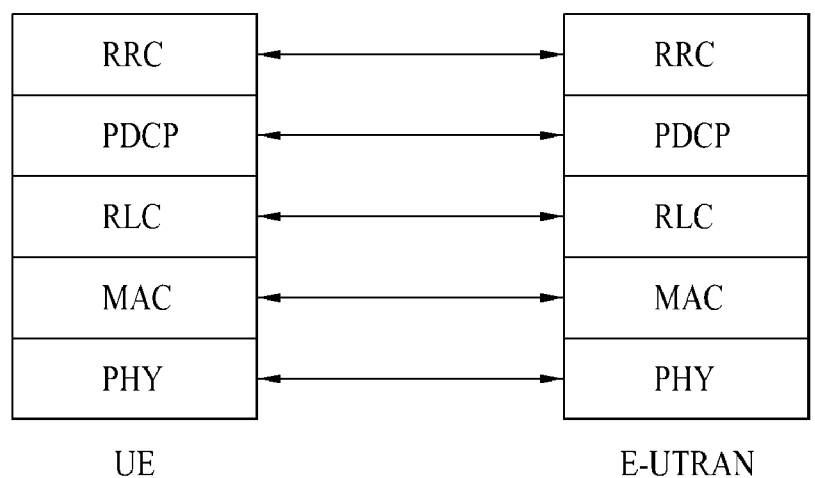
FIGS. 2 and 3 illustrate a radio interface protocol structure between a User Equipment (UE) and an E-UTRAN according to the 3GPP wireless access network standard.
Figure 3:
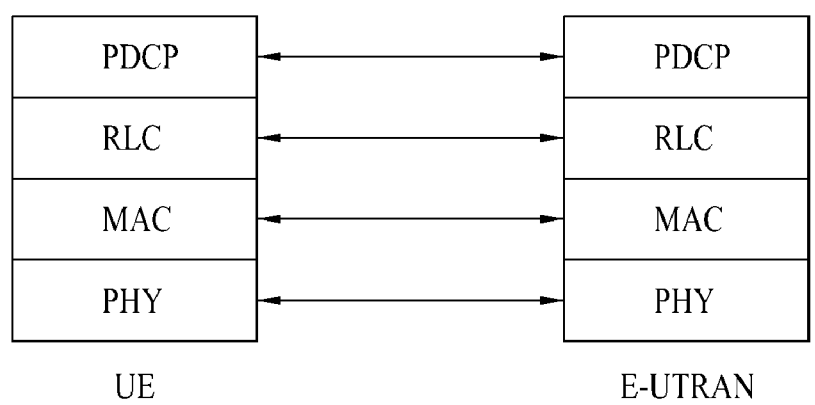

FIGS. 2 and 3 illustrate a radio interface protocol structure between a User Equipment (UE) and an E-UTRAN according to the 3GPP wireless access network standard.

A radio interface protocol includes a physical layer, a data link layer, and a network layer in a horizontal direction. In a vertical direction, the radio interface protocol includes a user plane (U-plane) for transmitting data information and a control plane (C-plane) for transmitting a control signal (i.e., a signaling message). The protocol layers shown in FIGS. 2 and 3 may be classified into a first layer (L1), a second layer (L2), and a third layer (L3) on the basis of the three lower layers of an Open System Interconnection (OSI) reference model well known in the field of communication systems. The UE and the E-UTRAN include a pair of such radio protocol layers, and are used to transmit data via an air interface.

The following is a detailed description of layers of the control plane (shown in FIG. 2) and user plane (shown in FIG. 3) in a radio interface protocol.

The physical layer, which is the first layer, provides an information transfer service to an upper layer using a physical channel. The physical layer is connected to a Medium Access Control (MAC) layer serving as an upper layer over a transport channel. Data is transferred from the MAC layer to the physical layer or the transport channel, or is also transferred from the physical layer to the MAC layer. In addition, data is transferred between different physical layers over the physical channel. In other words, data is transferred from a transmitting physical layer to a receiving physical layer over the physical channel. The above-mentioned physical channel is modulated according to an orthogonal frequency division multiplexing (OFDM) scheme, so that the physical channel uses time and frequency information as radio resources.

The MAC layer of the second layer (L2) transmits services to a Radio Link Control (RLC) layer serving as an upper layer over a logical channel. The RLC layer of the second layer (L2) supports reliable data transmission. The RLC layer function may be implemented as a functional block contained in the MAC layer. In this case, the RLC layer may not be present. A Packet Data Convergence Protocol (PDCP) layer of the second layer (L2) performs a header compression function to reduce the size of an IP packet header having relatively large and unnecessary control information in order to efficiently transmit IP packets such as IPv4 or IPv6 packets in a radio interval with a narrow bandwidth.

The radio resource control (RRC) layer located at the bottom of the third layer (L3) is defined on a control plane only. In association with configuration, re-configuration, and release of radio bearers (RBs), the RRC layer controls the logical channel, the transport channel, and the physical channels. In this case, the above radio bearer (RB) is provided from the second layer (L2) to perform data communication between the UE and the UTRAN. If an RRC connection is located between the RRC layer of the UE and the RRC layer of the radio network, the UE stays in an RRC connected (RRC_CONNECTED) state. Otherwise, the UE stays in an RRC idle (RRC_IDEL) state.

There are a variety of downlink transport channels for transmitting data from the network to the UE, for example, a broadcast channel (BCH) for transmitting system information, and a downlink shared channel (DL-SCH) for transmitting user traffic or control messages. Traffic or control messages of a downlink multicast or a broadcast service may be transmitted over a downlink shared channel (SCH) or a downlink multicast channel (MCH). In the meantime, there are a variety of uplink transport channels for transmitting data from the UE to the network, for example, a random access channel (RACH) for transmitting initial control messages, and an uplink shared channel for transmitting user traffic or control messages.

A variety of logical channels are located on the transport channel, and are mapped to the transport channel. For example, the logical channels may be a broadcast channel (BCCH), a paging control channel (PCCH), a common control channel (CCCH), a multicast control channel (MCCH), and a multicast traffic channel (MTCH).

A physical channel includes a plurality of subframes on the time axis and a plurality of subcarriers on the frequency axis. Here, one subframe includes a plurality of symbols on the time axis. One subframe includes a plurality of resource blocks and one resource block includes a plurality of symbols and a plurality of subcarriers. Each subframe can use specific subcarriers of a specific symbol (e.g., a first symbol) of the subframe for a Physical Downlink Control Channel (PDCCH) (i.e., an L1/L2 control channel). Each subframe is 0.5 ms long. A Transmission Time Interval (TTI), which is a unit time during which data is transmitted, is 1 ms.

System information will hereinafter be described in detail. The system information includes requisite information that must be recognized by the UE that desires to access a base station (BS). Accordingly, the UE must receive all the system information before accessing the BS, and must always include the latest system information. In addition, the system information must be recognized by all UEs contained in one cell, such that the BS periodically transmits the system information.

The system information is classified into a master information block (MIB), a scheduling block (SB), a system information block (SIB), etc. The MIB enables a UE to recognize physical configuration information (e.g., a bandwidth) of the corresponding cell. The SB includes transmission information such as a transmission period of each SIB. The SIB is an aggregate (or a set) of mutually-associated system information. For example, a certain SIB includes only information of a neighbor cell, and a certain SIB includes only information of an uplink radio channel used in the UE.

Services that the network provides to the UE may be classified into 3 types. The UE identifies the type of a cell differently according to which services the UE can receive from the cell. First, the service types are described as follows and then the types of the cell are described.

1) Limited service: This service provides an emergency call and an ETWS and can be provided by an acceptable cell.

2) Normal service: This is a general service for public use and can be provided by a suitable cell.

3) Operator service: This is a service for a communication network provider and a corresponding cell can be used only by the communication network provider and cannot be used by a general user.

The types of cells can be classified as follows in association with the types of services provided by the cells.

1) Acceptable cell: This is a cell from which the UE can receive a limited service. This cell is not barred for the UE and satisfies cell selection criteria for the UE.

2) Suitable cell: This is a cell from which the UE can receive a normal service. This cell satisfies acceptable cell conditions while satisfying additional conditions. The additional conditions include a condition that the cell belongs to a PLMN that can be accessed by the UE and a condition that, in the cell, the UE is not prohibited from performing a tracking area update procedure. If the cell is a CSG cell, it is required that the UE be able to access the cell as a CSG member.

3) Barred cell: This is a cell that broadcasts information indicating that it is a barred cell through system information.

4) Reserved cell: This is a cell that broadcasts information indicating that it is a reserved cell through system information.

An RRC state of a UE and an RRC connection method for the same are described below. The RRC state indicates whether or not an RRC layer of the UE is logically connected to an RRC layer of the E-UTRAN. It is stated that the UE is in an RRC_connected state when there is a logical connection between the RRC layer of the UE and the RRC layer of the E-UTRAN and that the UE is in an RRC_idle state when there is no logical connection therebetween. When the UE is in an RRC_connected state, the E-UTRAN can determine presence or absence of the UE on a cell basis since there is an RRC connection between the UE and the E-UTRAN and therefore can easily control the UE. On the other hand, when the UE is in an RRC_idle state, the E-UTRAN cannot determine presence or absence of the UE and manage a core network on the basis of a tracking area which is an area unit greater than the cell. That is, when the UE is in an RRC_idle state, the presence or absence of the UE is determined only on a large area basis and the UE needs to shift to an RRC_connected state in order to receive a general mobile communication service such as a voice or data service.

When the user initially powers the UE on, first, the UE searches for an appropriate cell and then remains in an RRC_idle state in the cell. When the UE needs to establish an RRC connection while the UE remains in an RRC_idle state, the UE shifts to an RRC_connected state by establishing an RRC connection with the E-UTRAN through an RRC connection procedure. In various cases, there may be a need to establish an RRC connection while the UE is in an idle state. For example, the UE may need to establish an RRC connection when there is a need to transmit uplink data because of the user's attempt to call or when there is a need to transmit a response message in response to a paging message received from the E-UTRAN.

A Non-Access Stratum (NAS) layer which is located above the RRC layer performs functions such as session management and mobility management.

In the NAS layer, two states, an EPS Mobility Management-registered (EMM-registered) state and an EMM-deregistered state, are defined in order to manage mobility of the UE. These two states are applied to the UE and the MME. Initially, the UE is in an EMM-deregistered state. Here, the UE performs a procedure for registering the UE in a network through an initial attach procedure in order to access the network. When the attach procedure has been successfully performed, the UE and the MME enter an EMM-registered state.

Two states, an EPS Connection Management (ECM)-idle state and an ECM-connected state, are defined in order to manage signaling connection between the UE and the EPC. These two states are applied to the UE and the MME. If the UE establishes an RRC connection with the E-UTRAN when the UE is in an ECM-idle state, the UE enters an ECM-connected state. If the MME establishes an S1 connection with the E-UTRAN when the MME is in an ECM-idle state, the MME enters an ECM-connected state. When the UE is in an ECM-idle state, the E-UTRAN does not have context information of the UE. Therefore, the UE performs a UE-based mobility related procedure such as cell selection or reselection without the need to receive a command from the network. On the other hand, when the UE is in an ECM-connected state, mobility of the UE is managed by a command from the network. When the position of the UE has changed from that known by the network while the UE is in an ECM-idle state, the UE notifies the network of the changed position of the UE through a tracking area update procedure.

The following is a description of a radio link failure procedure in a 3GPP LTE system.

Figure 4:
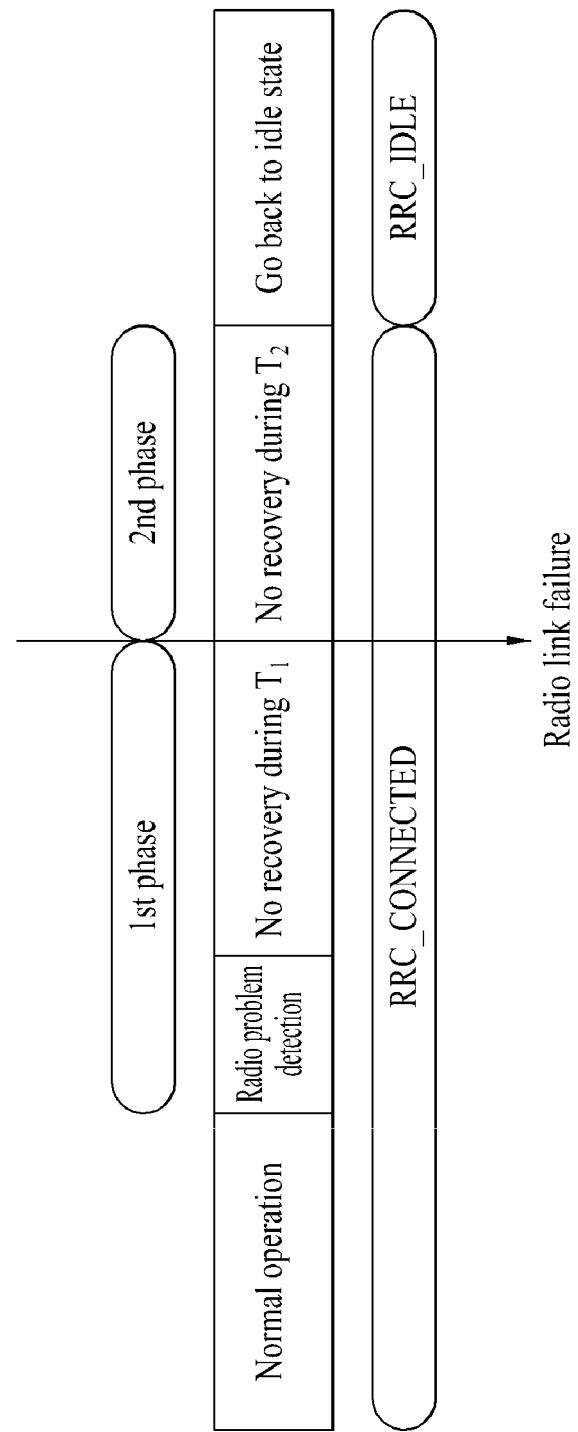
FIG. 4 is a conceptual diagram illustrating operations related to a radio link failure.

A UE constantly performs measurement in order to maintain the quality of a communication link with a cell which currently provides a service to the UE. Specifically, the UE determines whether or not the quality of the communication link with the cell that currently provides a service to the UE is bad to the extent that communication is impossible. Upon determining that the quality of the communication link is bad to the extent that communication is impossible, the UE declares radio link failure. If the UE declares radio link failure, the UE gives up keeping the communication with the cell and then attempts RRC connection re-establishment after selecting a cell through a cell selection procedure. Operations associated with such radio link failure may be performed in two steps as shown in FIG. 4.

In the first step, the UE checks if there is a problem in a current communication link. If there is a problem, the UE declares a radio link problem and awaits recovery of the communication link for a predetermined time of T1. If the link is recovered within the time T1, the UE continues normal operation. If the radio link problem is not solved within the time T1, the UE declares radio link failure and enters the second step. In the second step, the UE performs an RRC connection re-establishment procedure for recovery from radio link failure.

The RRC connection re-establishment procedure is a procedure for re-establishing an RRC connection in an RRC_connected state. The UE does not initialize all radio settings (for example, radio bearer setting) of the UE since the UE remains in an RRC_connected state, i.e., since the UE does not enter an RRC_idle state. Instead, the UE suspends use of all radio bearers excluding SRB0 when starting the RRC connection re-establishment procedure. If RRC connection re-establishment is successful, the UE resumes using the radio bearers, the use of which has been suspended.

Figure 5:
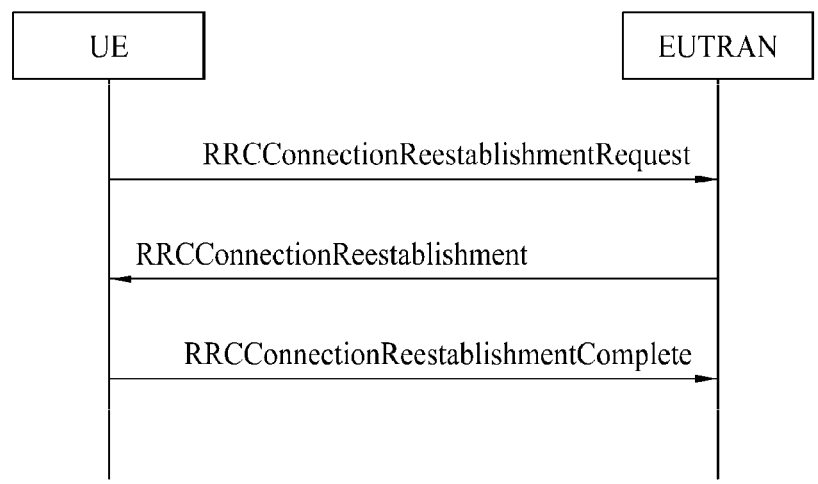
FIGS. 5 and 6 are views illustrating success of RRC connection re-establishment procedure, respectively.
Figure 6:
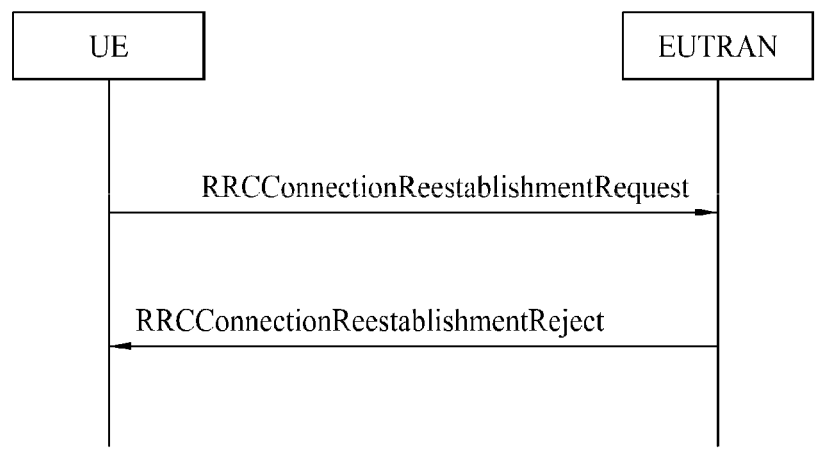

FIGS. 5 and 6 illustrate the case in which an RRC connection re-establishment procedure is successful and the case in which an RRC connection re-establishment procedure has failed.

How a UE operates in the RRC connection re-establishment procedure is described below with reference to FIGS. 5 and 6. First, the UE performs a cell selection procedure to select one cell. The UE receives system information in order to receive basic parameters for cell access from the selected cell. Then, the UE attempts RRC connection re-establishment through a random access procedure. When the cell that the UE has selected through cell selection is a cell (i.e., a prepared cell) which has context of the UE, the cell can accept the RRC connection re-establishment request of the UE, resulting in that the RRC connection re-establishment procedure is successful. However, when the cell selected by the UE is not a prepared cell, the cell cannot accept the RRC connection re-establishment request of the UE since the cell has no context of the UE, resulting in failure of the RRC connection re-establishment procedure.

Hereinafter, a quality measurement procedure in a 3GPP LTE system will be described.

Figure 7:
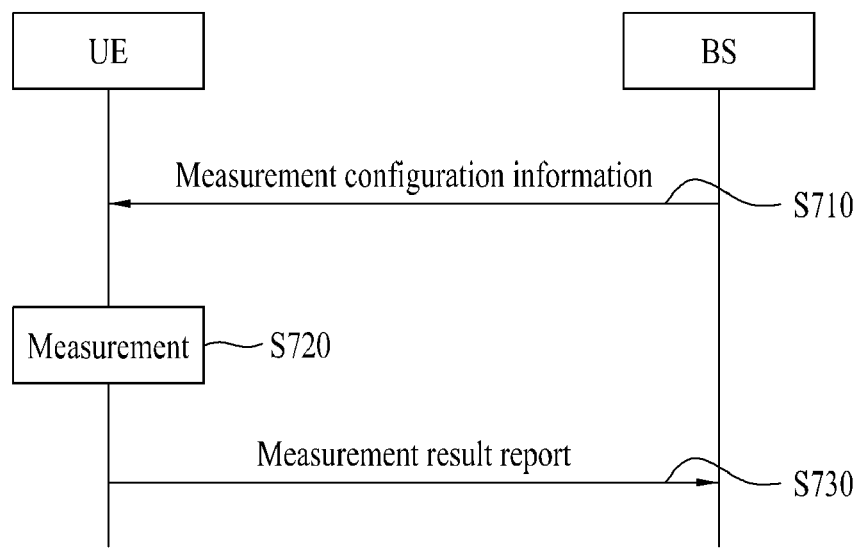
FIG. 7 is a view illustrating a procedure of a UE for performing measurement and reporting a measurement result to a network in a 3GPP LTE system.

FIG. 7 is a view illustrating a procedure of a UE for performing measurement and reporting a measurement result to a network in a 3GPP LTE system.

Referring to FIG. 7, a UE receives measurement configuration information from a BS (step S710). A message including the measurement configuration information is referred to as a measurement configuration message. The UE performs measurement based on the measurement configuration information (step S720). If a measurement result satisfies a reporting condition included in the measurement configuration information, the UE reports the measurement result to the BS (step S730). A message including the measurement result is referred to as a measurement report message.

On the other hand, the measurement configuration message received from the BS may have the following structure.

TABLE 1

```
RRCConnectionReconfiguration-r8-IEs ::= SEQUENCE {
    measConfig              MeasConfig      OPTIONAL,
    -- Need ON
}
MeasConfig ::=              SEQUENCE {
    -- Measurement objects
    measObjectToRemoveList          MeasObjectToRemoveList
    OPTIONAL,   -- Need ON
    measObjectToAddModList          MeasObjectToAddModList
    OPTIONAL,   -- Need ON
    -- Reporting configurations
    reportConfigToRemoveList        ReportConfigToRemoveList
    OPTIONAL,   -- Need ON
    reportConfigToAddModList        ReportConfigToAddModList
    OPTIONAL,   -- Need ON
    -- Measurement identities
    measIdToRemoveList              MeasIdToRemoveList
    OPTIONAL,   -- Need ON
    measIdToAddModList              MeasIdToAddModList
    OPTIONAL,   -- Need ON
    -- Other parameters
    quantityConfig          QuantityConfig  OPTIONAL,
    -- Need ON
    measGapConfig           MeasGapConfig
    OPTIONAL,   -- Need ON
    s-Measure               RSRP-Range      OPTIONAL,
    -- Need ON
    preRegistrationInfoHRPD         PreRegistrationInfoHRPD
    OPTIONAL,   -- Need OP
    speedStatePars          CHOICE {
        release                     NULL,
        setup                       SEQUENCE {
            mobilityStateParameters         MobilityStateParameters,
            timeToTrigger-SF                SpeedStateScaleFactors
        }
    }                                       OPTIONAL,
    -- Need ON
    ...
}
```

The measurement configuration information contained in the measurement configuration message shown in Table 1 may include the following information.

(1) Measurement object information: This information denotes an object that the UE measures. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighbor cell having the same frequency band as a frequency band of a serving cell, the inter-frequency measurement object may indicate a neighbor cell having a different frequency band from a frequency band of the serving cell, and the inter-RAT measurement object may indicate a neighbor cell of a different RAT from an RAT of the serving cell.

(2) Reporting configuration information: This information denotes a reporting condition and a reporting type regarding when the UE reports a measurement result. The reporting condition may include information on a period or an event for triggering reporting of the measurement result. The reporting type is information indicating a particular type according to how to configure the measurement result.

(3) Measurement identity information: This information denotes a measurement identifier for determining when the UE will report measurement with respect to any measurement object by associating the measurement object with a reporting configuration, and which type of reporting is used by UE. The measurement identity information may be included in the measurement report message to indicate which measurement object the measurement result is about and which reporting condition was used.

(4) Quantity configuration information: This information denotes a measurement unit, a reporting unit, and/or a parameter for determining filtering of a measurement result value.

(5) Measurement gap information: This information denotes a measurement gap which is a duration that may be used by the UE only for measurement without any consideration of data transmission to a serving cell when downlink transmission or uplink transmission is not scheduled.

To perform a measurement procedure, the UE may have a measurement object list, a measurement reporting configuration list, and a measurement identity list.

In 3GPP LTE, the BS may assign only one measurement object to the UE with respect to one frequency band. Events for triggering measurement reporting shown in the following table below are defined in section 5.5.4 of 3GPP TS 36.331 V8.5.0 (2009-03) "Evolved Universal Terrestrial Radio Access (E-UTRA) Radio Resource Control (RRC); Protocol specification (Release 8)".

TABLE 2

| Event | Reporting Condition |
| --- | --- |
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 8:
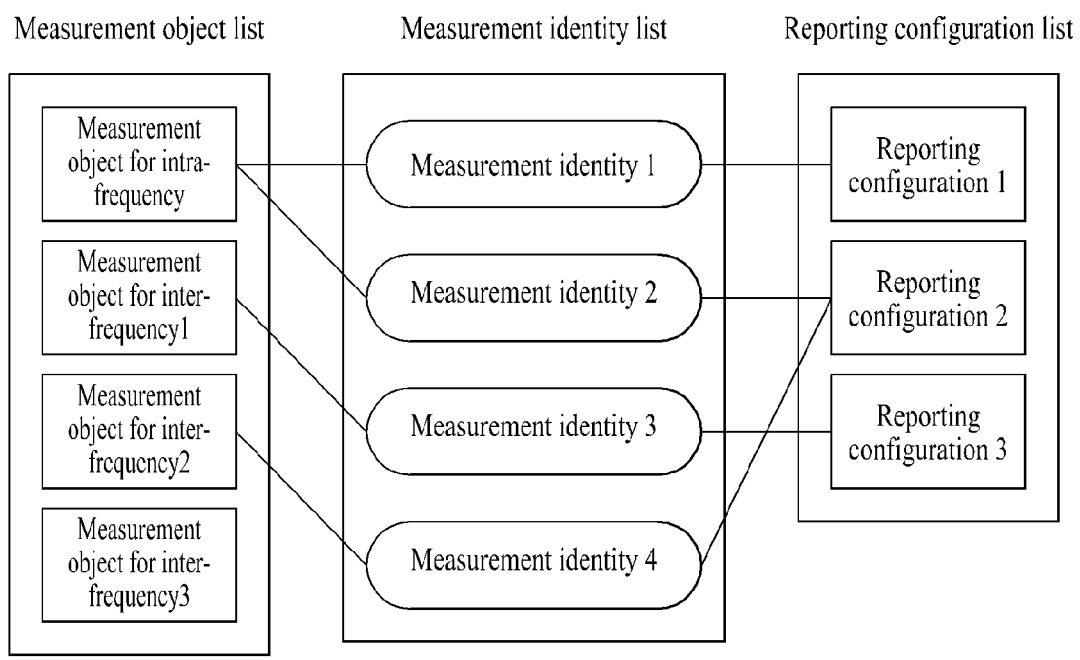
FIG. 8 illustrates an example of a measurement configuration assigned to a UE.

FIG. 8 illustrates an example of a measurement configuration assigned to a UE.

In FIG. 8, a measurement identity 1 associates an intra-frequency measurement object with a reporting configuration 1. The UE performs intra-frequency measurement. The reporting configuration 1 is used to determine a reporting type and a criterion for reporting a measurement result.

A measurement identity 2 is associated with the intra-frequency measurement object similarly to the measurement identity 1 but associates the intra-frequency measurement object with a reporting configuration 2. The UE performs intra-frequency measurement. The reporting configuration 2 is used to determine a reporting type and a criterion for reporting a measurement result.

By the measurement identity 1 and the measurement identity 2, the UE may transmit a measurement result to a network even if the measurement result of the intra-frequency measurement object satisfies any one of the reporting configuration 1 and the reporting configuration 2.

A measurement identity 3 associates an inter-frequency measurement object 1 with a reporting configuration 3. If a measurement result of the inter-frequency measurement object 1 satisfies a reporting condition included in the reporting configuration 3, the UE may report the measurement result to the network.

A measurement identity 4 associates an inter-frequency measurement object 2 with the reporting configuration 2. When a measurement result on the inter-frequency measurement object 2 satisfies a reporting condition included in the reporting configuration 2, the UE may report the measurement result to the network.

Meanwhile, the measurement object, the reporting configuration, and/or the measurement identity may be added, modified and/or removed, by transmitting a new measurement configuration message or a measurement configuration modification message to the UE by the BS.

Figure 9:
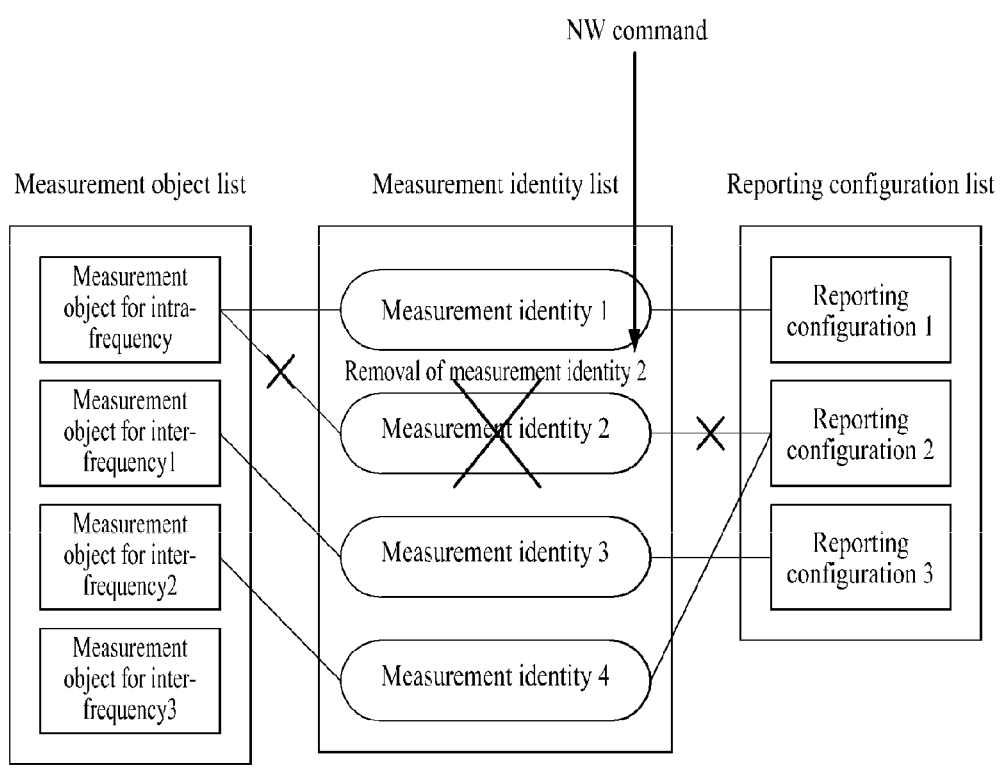
FIG. 9 illustrates an example of removing a measurement identity.

FIG. 9 illustrates an example of removing a measurement identity.

In FIG. 9, "NW command" may be a measurement configuration message or a measurement configuration modification message instructing a UE to remove a measurement identity 2. When the measurement identity 2 is removed, measurement of a measurement object associated with the measurement identity 2 is stopped, and a measurement report is not transmitted. However, a measurement object or a reporting configuration associated with the removed measurement identity may not be modified.

Figure 10:
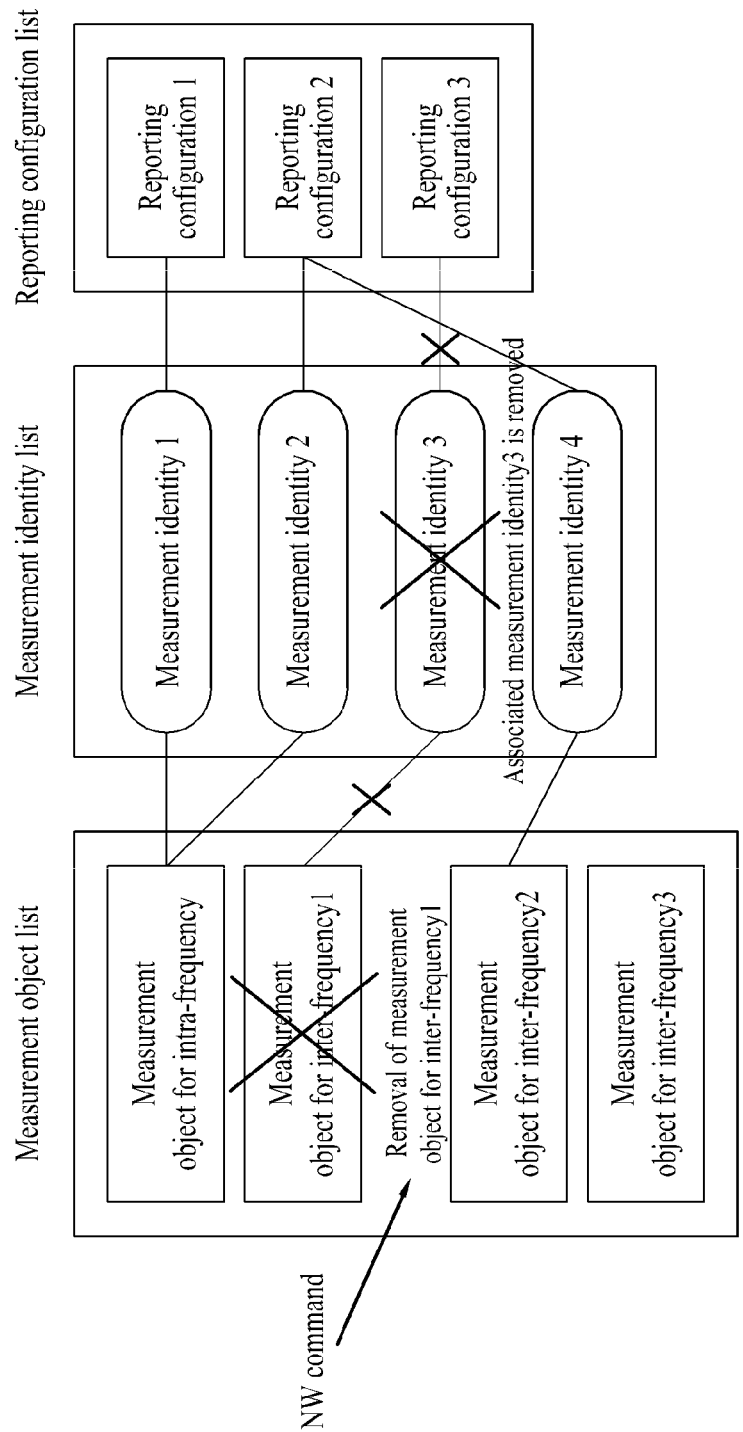
FIG. 10 illustrates an example of removing a measurement object.

FIG. 10 illustrates an example of removing a measurement object.

In FIG. 10, "NW command" may be a measurement configuration message or a measurement configuration modification message instructing a UE that an inter-frequency measurement object 1 be removed. If the inter-frequency measurement object 1 is removed, the UE may also remove a measurement identify 3 associated therewith. Measurement of the inter-frequency measurement object 1 is stopped, and a measurement report may not be transmitted. However, a reporting configuration associated with the removed inter-frequency measurement object 1 may not be modified or removed.

When the reporting configuration is removed, the UE also removes an associated measurement identity. The UE suspends measurement reporting and measurement of an associated measurement object according to the associated measurement identity. However, a measurement object associated with the removed reporting configuration may not be modified or removed.

Figure 11:
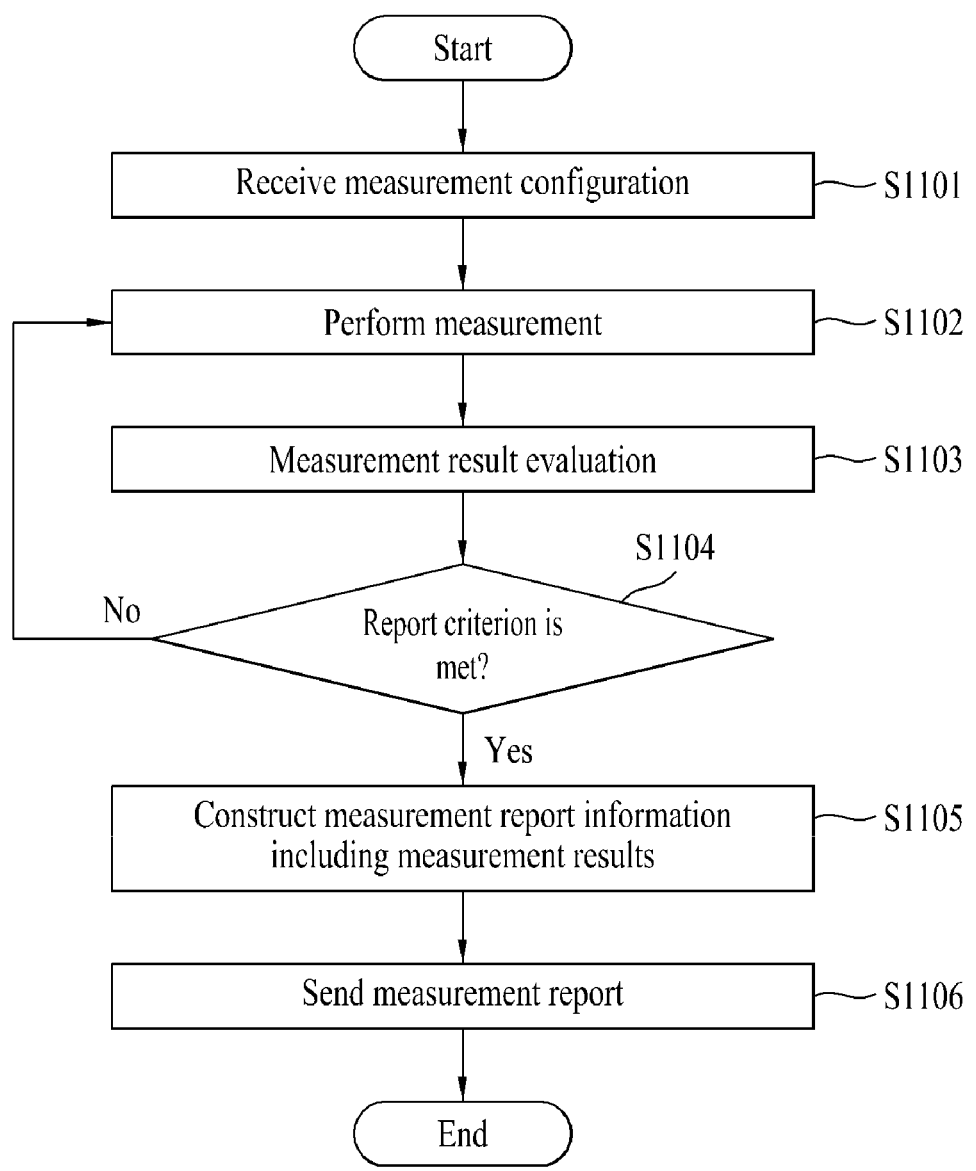
FIG. 11 is a flowchart illustrating the above-mentioned measurement operation.

FIG. 11 is a flowchart illustrating the above-mentioned measurement operation.

Referring to FIG. 11, the UE can receive measurement configuration information from the eNode B (network) in step S1101. In association with Table 1, the measurement configuration information may include measurement object information, reporting configuration information, measurement identity information, quantity configuration information, and measurement gap information. In addition, in association with FIGS. 9 and 19, the measurement configuration information may include specific measurement object information and/or specific measurement identity deletion/addition information, and the like.

The UE can perform quality measurement in response to the received measurement configuration information in step S1102. The UE can measure a measurement result evaluation procedure to determine whether the quality measurement result value meets the quality report criterion in step S1103. In this case, the evaluation criterion may use the above-mentioned schemes shown in Table 2. If the measurement result satisfies the report criterion in step S1104, the UE constructs measurement report information including the measurement result in step S1105 and transmits the measurement report information to the eNode B (network) in step S1106. Examples of the measurement report message for use in the 3GPP LTE system are as follows.

TABLE 3

```
MeasResults ::=              SEQUENCE {
    measId                       MeasId,
    measResultServCell           SEQUENCE {
        rsrpResult                   RSRP-Range,
        rsrqResult                   RSRQ-Range
    },
    measResultNeighCells         CHOICE {
        measResultListEUTRA              SEQUENCE (SIZE
                                             (1..maxCellReport))
                                     OF
            physCellId                   PhysCellId,
            measResult                   SEQUENCE {
                rsrpResult                   RSRP-Range
            OPTIONAL,
                rsrqResult                   RSRQ-Range
            OPTIONAL,
                ...,
            }
}
```

The following information can be contained in the measurement report message shown in Table 3, and a detailed description thereof will be described below.

Measurement Identity:

The measurement identity is associated with report configuration satisfying the reporting criterion. Through the measurement identity, the network can recognize which criterion was used to transmit the measurement report received from a UE.

Quality Value of the Measured Serving Cell:

This information denotes a quality value of the serving cell measured by a UE.

Information of the Measured Neighbor Cell:

This information denotes a measurement identity of a neighbor cell measured by a UE.

Neighbor Cell Identity:

This information denotes a physical cell identity (e.g., PCI for E-UTRAN) of a neighbor cell satisfying the reporting criterion.

Quality Value of Neighbor Cell:

This information denotes a quality value (e.g., RSRP, RSRQ) of a neighbor cell satisfying the reporting criterion.

In accordance with the above-mentioned examples, the UE efficiently measures a quality of the serving cell and/or the neighbor cell, and reports the measured quality to the eNode B, such that it can guarantee UE mobility. However, one embodiment of the present invention provides not only the above-mentioned measurement operation but also an efficient quality measurement operation by the UE which simultaneously includes a plurality of serving cells. For this purpose, the present invention provides a carrier aggregation (CA) technology which is being intensively discussed in the 3GPP LTE-A standard as an exemplary case in which the UE includes a plurality of serving cells.

Figure 12:
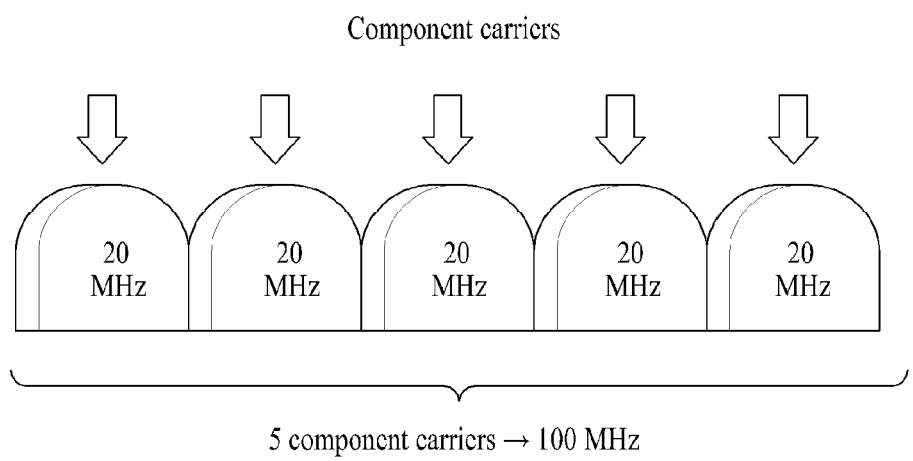
FIG. 12 is a conceptual diagram illustrating a carrier aggregation technology applied to the 3GPP LTE-A system.

FIG. 12 is a conceptual diagram illustrating a carrier aggregation technology applied to the 3GPP LTE-A system.

The LTE-A technology standard is IMT-Advanced candidate technology of the International Telecommunication Union (ITU) and is designed to meet the requirements of the IMT-Advanced technology of the ITU. In the LTE-A, in order to satisfy the requirements of the ITU, extension of a bandwidth of the existing LTE system is being discussed. In the LTE-A system, in order to extend bandwidth, a carrier of the existing LTE system is defined as a Component Carrier (CC) and a method of aggregating and utilizing a maximum of five CCs is being discussed. Since the CC may have a maximum bandwidth of 20 MHz as in the LTE system, the bandwidth may extend to 100 MHZ at maximum. Carrier aggregation is a technique for aggregating a plurality of CCs.

Figure 13:
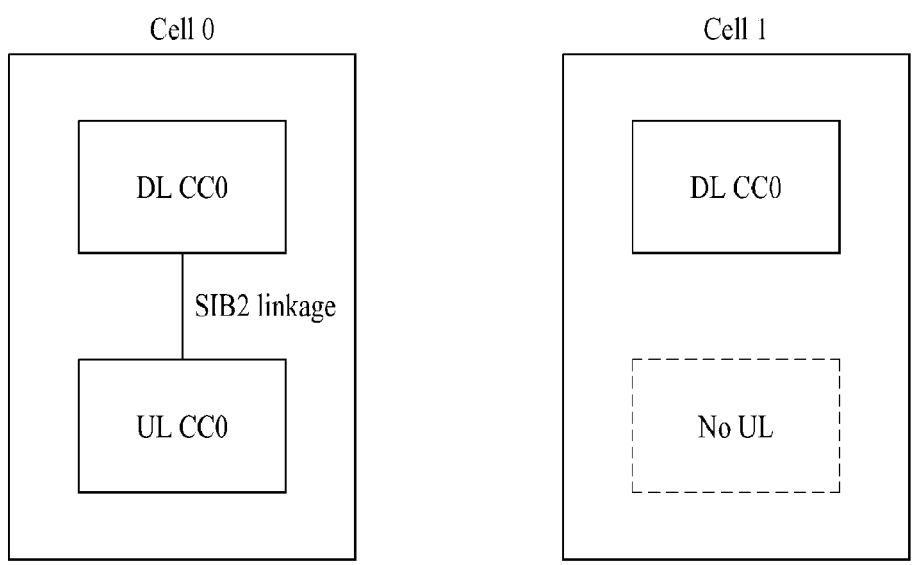
FIG. 13 is a conceptual diagram illustrating a method for enabling a UE to define a cell using a carrier aggregation (CA) technology.

FIG. 13 is a conceptual diagram illustrating a method for enabling a UE to define a cell using a carrier aggregation (CA) technology.

If the carrier aggregation (CA) technology is used as shown in FIG. 12, each of downlink (DL) and uplink (UL) may include a plurality of CCs. In the CA system, from the viewpoint of the UE, a combination (Cell 0 of FIG. 13) of DL CC and UL CC, or only DL CC (Cell 1 of FIG. 13) may be considered to be a cell. As can be seen from FIG. 13, linkage between DL CC and UL CC may be indicated by system information transmitted through DL resources. That is, the system information of the CA based mobile communication system further includes information regarding the linkage relationship between UL CC and DL CC, as represented by SIB2 linkage shown in FIG. 13.

On the other hand, the LTE-A system discriminates some CCs through which all control signaling is transmitted from other CCs, and each discriminated CC is referred to as a primary CC. UL primary CC and DL primary CC are configured in each UE. A combination of UL primary CC used for transmission of UL control information and DL primary CC used for transmission of DL control information may be referred to as a primary cell or PCell. The remaining cells configured in the UE other than the primary cell (or PCell) may be referred to as secondary cells (or SCells).

When the UE for use in the above-mentioned CA based mobile communication system determines whether the quality measurement result satisfies the reporting criterion, the UE selects a specific reference cell from among a plurality of UE-configured cells and uses the selected reference cell to determine whether the quality measurement result satisfies the reporting criterion. In addition, the above-mentioned embodiment for use in the CA based mobile communication system informs the eNode B of information regarding a reference cell used by a UE so as to prevent misunderstanding of the eNode B.

Figure 14:
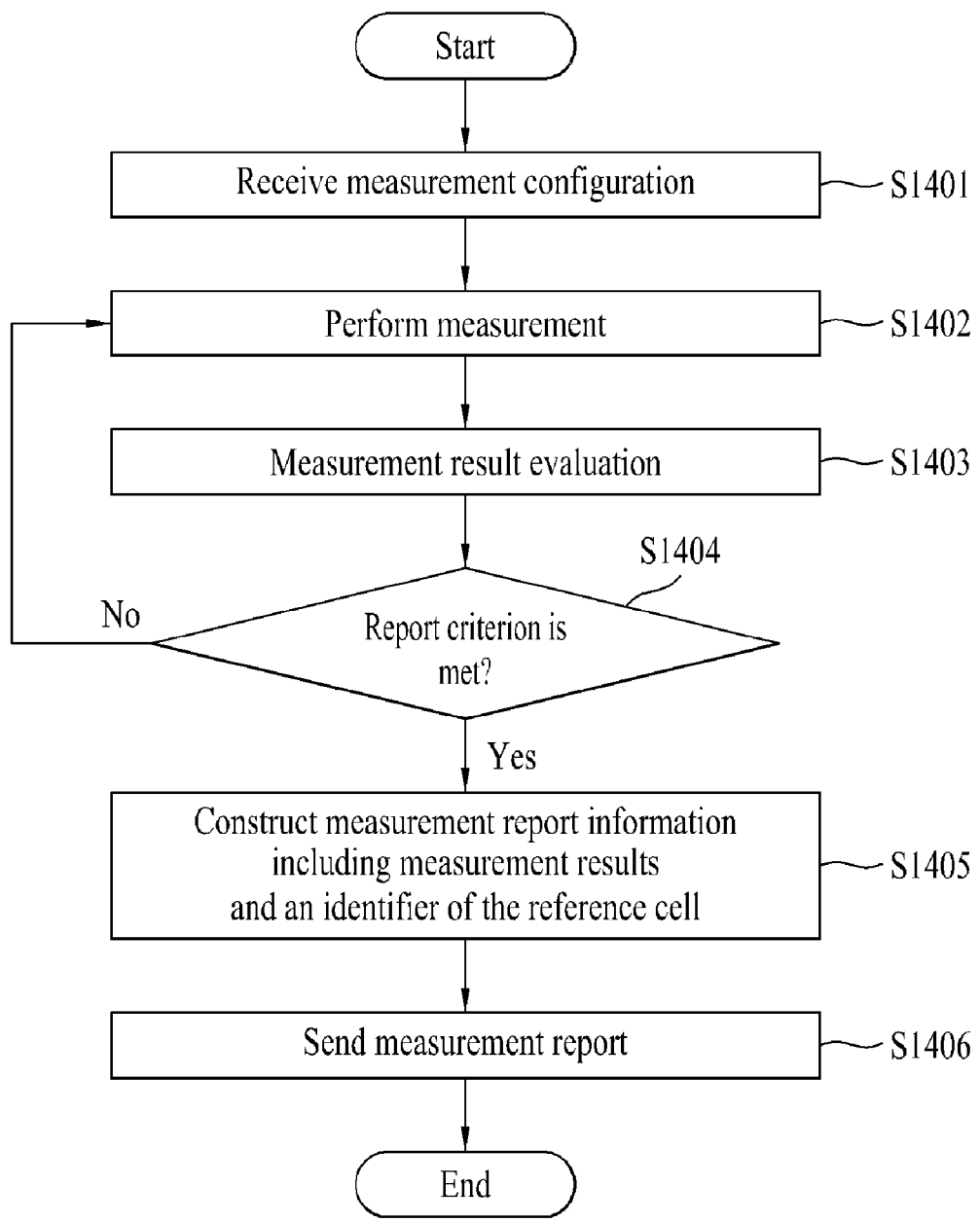
FIG. 14 is a flowchart illustrating a method for enabling a UE to perform quality measurement report on the basis of a specific reference cell in a CA based mobile communication system according to an embodiment of the present invention.

FIG. 14 is a flowchart illustrating a method for enabling a UE to perform quality measurement report on the basis of a specific reference cell in a CA based mobile communication system according to an embodiment of the present invention.

Referring to FIG. 14, the UE can receive measurement configuration information from the eNode B (network) in step S1401. In association with Table 1, the measurement configuration information may include measurement object information, reporting configuration information, measurement identity information, quantity configuration information, and measurement gap information. In addition, in association with FIGS. 9 and 10, the measurement configuration information may include specific measurement object information and/or specific measurement identity deletion/addition information, and the like.

The UE can perform quality measurement in response to the received measurement configuration information in step S1402. The UE can measure a measurement result evaluation procedure to determine whether the quality measurement result value meets the quality report criterion in step S1403. This embodiment of the present invention provides a method for allowing a UE to determine whether the measured quality value satisfies a measurement report criterion on the basis of a specific reference cell from among a plurality of UE-configured cells. In this case, various reference cells capable of being used by the UE are as follows.

(1) Reference Cell Selection Reference 1:

Whenever a UE evaluates a measurement value, a cell having the best quality from among measurement values of a plurality of reference cells is determined to be a reference cell.

(2) Reference Cell Selection Reference 2:

Whenever a UE evaluates a measurement value, a cell having the lowest quality from among measurement values of a plurality of reference cells is determined to be a reference cell.

(3) Reference Cell Selection Reference 3:

Whenever a UE evaluate a measurement value, the UE can randomly select a reference cell from among a plurality of reference cells.

In this case, the evaluation criterion may be selected from among various schemes shown in Table 2. In accordance with this embodiment, the UE may select a reference cell selected by any one of the above-mentioned references 1 to 3 to be the serving cell of Table 2, and evaluate the selected cell.

In more detail, if a measurement value of a specific reference cell selected by the UE is better than a predetermined threshold value, the UE may report the measurement report to the eNode B. For example, the following measurement reporting events can be used as the report criteria. Here, the Event A1 and Event A2 of Table 4 are available for each configured CC.

TABLE 4

Event A1 (Reference becomes better than threshold)
Event A2 (Reference becomes worse than threshold)

On the other hand, if a measurement value of a specific reference cell selected by the UE is worse than that of the neighbor cell, the UE can also report the measurement result to the eNode B. For example, the following measurement report events can be used as the report criteria. Here, the measurement reference CC for Event A3 of Table 5 can be tied to an anchor CC.

TABLE 5

Event A3 (Neighbor becomes offset better than the Reference)
Event A5 (Reference becomes worse than threshold1 and neighbor becomes better than threshold2)
Event B2 (Reference becomes worse than threshold1 and inter RAT neighbor becomes better than threshold2)

If the measurement result satisfies the above-mentioned report criterion in step S1404, the UE constructs measurement report information including the measurement result, and an identity (or identifier) of a reference cell used for evaluation of the measurement result is included in the measurement report information in step S1405. This embodiment assumes that the eNode B is unable to recognize a reference cell used for evaluation of the measurement value, and an example of the measurement report message according to the embodiment is as follows.

TABLE 6

| MeasResults ::= | SEQUENCE { |
| --- | --- |
| measId | MeasId, |
| measResultServCell | SEQUENCE { |
| rsrpResult | RSRP-Range |
| rsrqResult | RSRQ-Range |
| }, | |
| measResultNeighCells | CHOICE { |
| measResultListEUTRA | SEQUENCE (SIZE (1..maxCellReport)) OF |
| physCellId | PhysCellId, |
| measResult | SEQUENCE { |
| rsrpResult | RSRP-Range OPTIONAL, |
| rsrqResult | RSRQ-Range OPTIONAL, |
| ..., | |
| } | |
| measRefId | CellIdentifier |
| } | |

That is, a measurement-value-evaluation reference serving cell identity field ("measRefID" field of Table 6) is added to the measurement report message shown in Table 3, and the UE may inform the eNode B of an identity (or identifier) of a cell which was used as a reference serving cell for the measurement value evaluation. In this case, "CellIdentifier" may denote an identifier of a serving cell, an identifier of a physical cell, or any other equivalent cell identifier according to the embodiments. If only the serving cell of the UE can be used as a provisional reference cell of the UE, "CellIdentifier" may denote the identifier of the serving cell.

Figure 15:
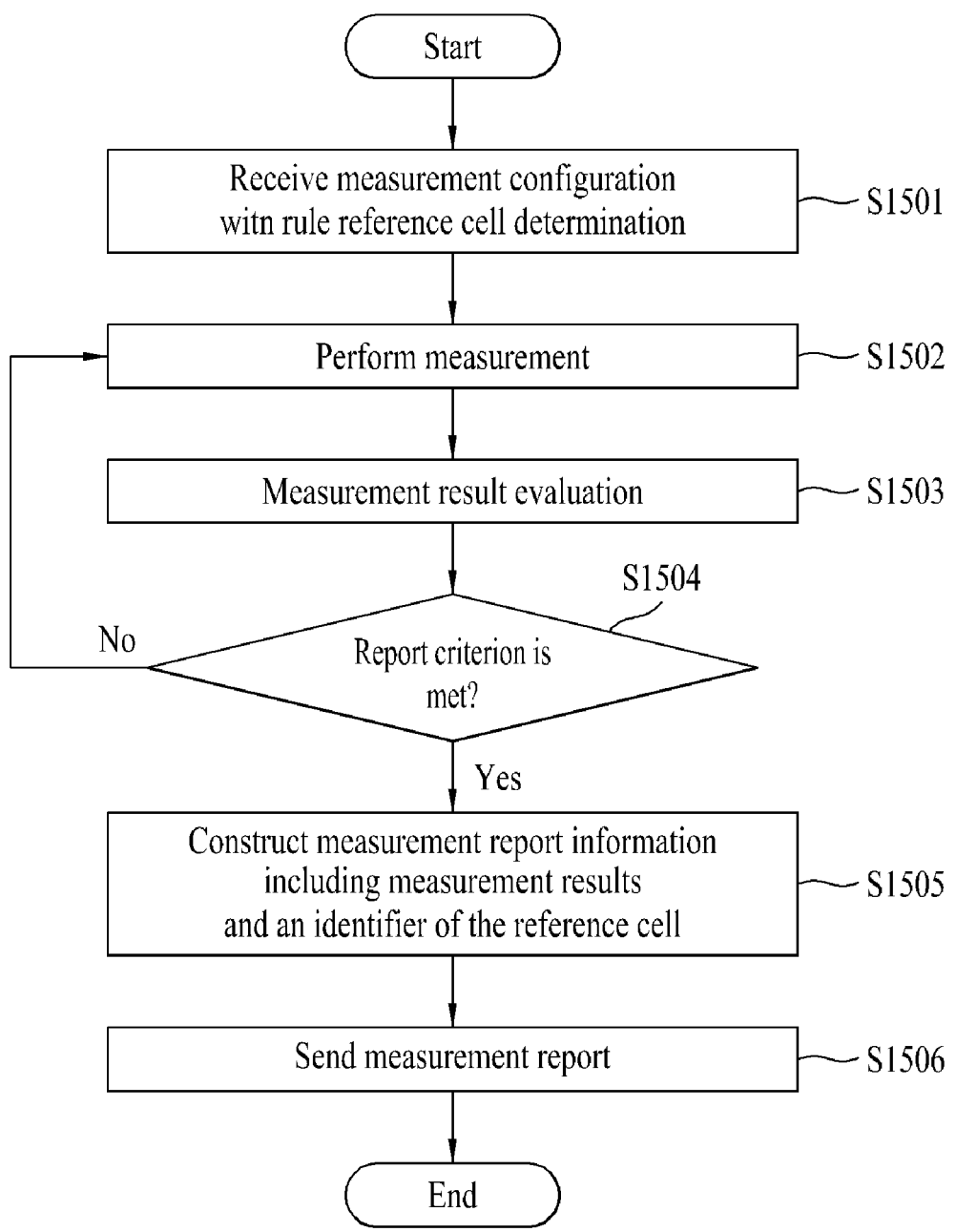
FIG. 15 is a flowchart illustrating a method for enabling a UE to perform quality measurement report on the basis of a specific reference cell in a CA based mobile communication system according to another embodiment of the present invention.

FIG. 15 is a flowchart illustrating a method for enabling a UE to perform quality measurement report on the basis of a specific reference cell in a CA based mobile communication system according to another embodiment of the present invention.

Referring to FIG. 15, the UE receives measurement configuration information from the eNode B (network) in step S1501. In this case, the received measurement configuration information may be configured in the form of a message which further includes information of a reference cell determination scheme used for evaluation of the measurement result in step S1501. For example, an example of the measurement configuration information message transferred from the UE to the eNode B is as follows.

TABLE 7

| RRCConnectionReconfiguration-r8-IEs ::= SEQUENCE { | | |
| --- | --- | --- |
| measConfig | MeasConfig | OPTIONAL, |
| -- Need ON | | |
| } | | |
| MeasConfig ::= | SEQUENCE { | |
| -- Measurement objects | | |
| measObjectToRemoveList | MeasObjectToRemoveList | |
| OPTIONAL, -- Need ON | | |
| measObjectToAddModList | MeasObjectToAddModList | |
| OPTIONAL, -- Need ON | | |
| -- Reporting configurations | | |
| reportConfigToRemoveList | ReportConfigToRemoveList | |
| OPTIONAL, -- Need ON | | |

TABLE 7-continued

| reportConfigToAddModList | ReportConfigToAddModList | |
| --- | --- | --- |
| OPTIONAL, -- Need ON | | |
| -- Measurement identities | | |
| measIdToRemoveList | MeasIdToRemoveList | |
| OPTIONAL, -- Need ON | | |
| measIdtoAddModList | MeasIdToAddModList | |
| OPTIONAL, -- Need ON | | |
| -- Other parameters | | |
| quantityConfig | QuantityConfig | OPTIONAL, |
| -- Need ON | | |
| measGapConfig | MeasGapConfig | |
| OPTIONAL, -- Need ON | | |
| s-Measure | RSRP-Range | OPTIONAL, |
| -- Need ON | | |
| preRegistrationInfoHRPD | PreRegistrationInfoHRPD | |
| OPTIONAL, -- Need OP | | |
| speedStatePars | CHOICE { | |
| release | NULL, | |
| setup | SEQUENCE { | |
| mobilityStateParameters | MobilityStateParameters, | |
| timeToTrigger-SF | SpeedStateScaleFactors | |
| } | | |
| } | | OPTIONAL, |
| -- Need ON | | |
| referenceCellSelectionRule | ENUMERATED { best cell, worst cell,random cell, spare1} | |
| | | OPTIONAL, |
| -- Need ON | | |
| ... | | |
| } | | |

In more detail, if the above-mentioned measurement configuration information message shown in Table 1 further includes a specific field (referenceCellSelectionRule) indicating the scheme for selecting a reference cell to be used for evaluation of the measurement value, a new measurement configuration information message shown in table 7 can be implemented. As the reference cell selection criteria to be used for evaluating the measurement value, the above-mentioned reference cell selection criteria (1) to (3) can be used. In more detail, "Best Cell" may indicate a scheme in which one cell having the best quality from among measurement values of a plurality of reference cells is determined to be a reference cell whenever the UE evaluates the measurement value. "Worst Cell" may indicate a scheme in which one cell having the worst quality from among measurement values of a plurality of reference cells is determined to be a reference cell whenever the UE evaluates the measurement value. "Random Cell" may indicate a scheme in which the UE can randomly select a reference cell from among a plurality of reference cells whenever the UE evaluates the measurement value. In this embodiment, "referenceCellSelectionRule" field is optional (See "OPTIONAL" of Table 7). If the "referenceCellSelectionRule" field is omitted from the measurement configuration information message, the UE may not select/use the reference cell when evaluating the measurement result (See "Need ON(Optionally No-action)" of Table 7). In FIG. 15, the remaining operations other than the above-mentioned operations may correspond to the operations of FIG. 14, and as such a detailed description thereof will herein be omitted for the convenience of description.

In accordance with another embodiment, the eNode B can provide information regarding a reference cell to be used for evaluation of the measurement result to the UE in a similar way to the above-mentioned embodiment shown in FIG. 15. In more detail, in accordance with another embodiment, the eNode B can provide identifier information capable of specifying a reference cell to the UE. In accordance with this embodiment, the measurement configuration message transmitted from the UE to the eNode B is as follows.

TABLE 8

```
RRCConnectionReconfiguration-r8-IEs ::= SEQUENCE {
    measConfig               MeasConfig         OPTIONAL,
    -- Need ON
}
MeasConfig ::=               SEQUENCE {
    -- Measurement objects
    measObjectToRemoveList         MeasObjectToRemoveList
    OPTIONAL,   -- Need ON
    measObjectToAddModLis          MeasObjectToAddModList
    OPTIONAL,   -- Need ON
    -- Reporting configurations
    reportConfigToRemoveList       ReportConfigToRemoveList
    OPTIONAL,   -- Need ON
    reportConfigToAddModList       ReportConfigToAddModList
    OPTIONAL,   -- Need ON
    -- Measurement identities
    measIdToRemoveList             MeasIdToRemoveList
    OPTIONAL,   -- Need ON
    measIdToAddModList             MeasIdToAddModList
    OPTIONAL,   -- Need ON
    -- Other parameters
    quantityConfig           QuantityConfig     OPTIONAL,
    -- Need ON
    measGapConfig            MeasGapConfig
    OPTIONAL,   -- Need ON
    s-Measure                RSRP-Range         OPTIONAL,
    -- Need ON
    preRegistrationInfoHRPD        PreRegistrationInfoHRPD
    OPTIONAL,   -- Need OP
    speedStatePars      CHOICE {
        release                     NULL,
        setup                       SEQUENCE {
            mobilityStateParameters        MobilityStateParameters,
            timeToTrigger-SF               SpeedStateScaleFactors
        }
    }                                            OPTIONAL,
    -- Need ON
    referenceCell            CellIdentifier     OPTIONAL,
    -- Need ON
    ...
}
```

That is, this embodiment provides a method for allowing the eNode B to directly inform the UE of the identifier of the reference cell through the "referenceCell" field, differently from Table 7. In this case, according to the embodiments, "CellIdentifier" may denote a serving cell ID, a physical cell ID, or any other equivalent cell ID. If only the serving cell of the UE can be used as a provisional reference cell of the UE, "CellIdentifier" may denote the serving cell ID.

In addition, according to this embodiment, when the UE reports the measurement result to the eNode B, the UE need not inform the eNode B of an ID of the reference cell used for evaluation of the measurement value. That is, the UE operation of informing the eNode B of the reference cell ID may be limited to the case in which the eNode B is unable to recognize the reference cell ID.

Figure 16:
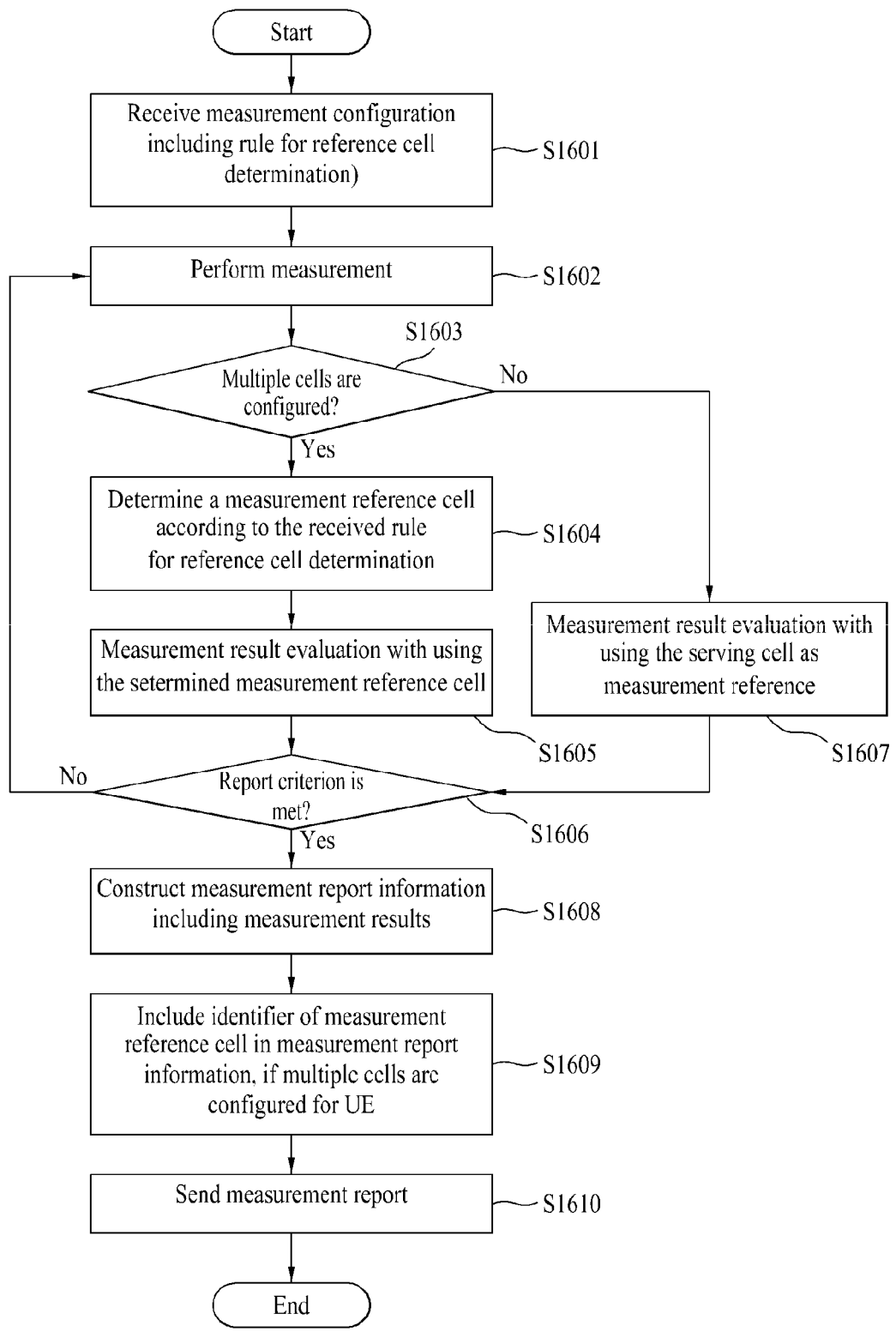
FIG. 16 is a flowchart illustrating a method for enabling a UE to perform quality measurement report on the basis of a specific reference cell in a CA based mobile communication system according to embodiments of the present invention.

FIG. 16 is a flowchart illustrating a method for enabling a UE to perform quality measurement report on the basis of a specific reference cell in a CA based mobile communication system according to the above-mentioned embodiments of the present invention.

Referring to FIG. 16, the UE can receive measurement configuration information from the eNode B in step S1601. In this case, the measurement configuration information may include information regarding a reference cell selection scheme to be used for evaluation of the measurement result by the UE as shown in Table 7. In still another embodiment, although the UE can receive a measurement configuration message including a reference cell ID as shown in Table 8, it is assumed that the eNode B provides only information of the reference cell selection rule. The UE can perform quality measurement according to the received measurement configuration information in step S1602.

Thereafter, the UE according to one embodiment of the present invention can determine whether several cells were configured in the UE in step S1603. If several cells were not configured in the UE in step S1603, the UE evaluates the measurement result according to the received measurement configuration information in step S1607. Otherwise, if several cells were configured in the UE in step S1603, the UE can determine a reference cell to be used for evaluation of the measurement result according to the reference cell selection rule received at step S1601 (Step S1604). The UE can apply the determined reference cell to the criteria shown in Tables 4 and 5, such that the UE can perform the measurement result evaluation on the basis of the determined reference cell in step S1605.

If the measurement result meets the report criterion in step S1606, the UE can construct measurement report information including the measurement result value in step S1608. If the eNode B is unable to recognize reference cell information used by the UE evaluating the measurement result, the UE may include an ID of the reference cell used for evaluation of the measurement result in the measurement report message in step S1609. The measurement report message may be configured in the form of a structure shown in Table 6.

In accordance with this embodiment, since the UE performs quality measurement reporting in step S1610, the UE can flexibly report the quality measurement result in the CA based mobile communication system and can guarantee UE mobility without causing misunderstanding of the eNode B.

A UE device and an eNB device for performing the above-mentioned quality measurement reporting mechanism according to another aspect of the present invention will hereinafter be described in detail.

Figure 17:
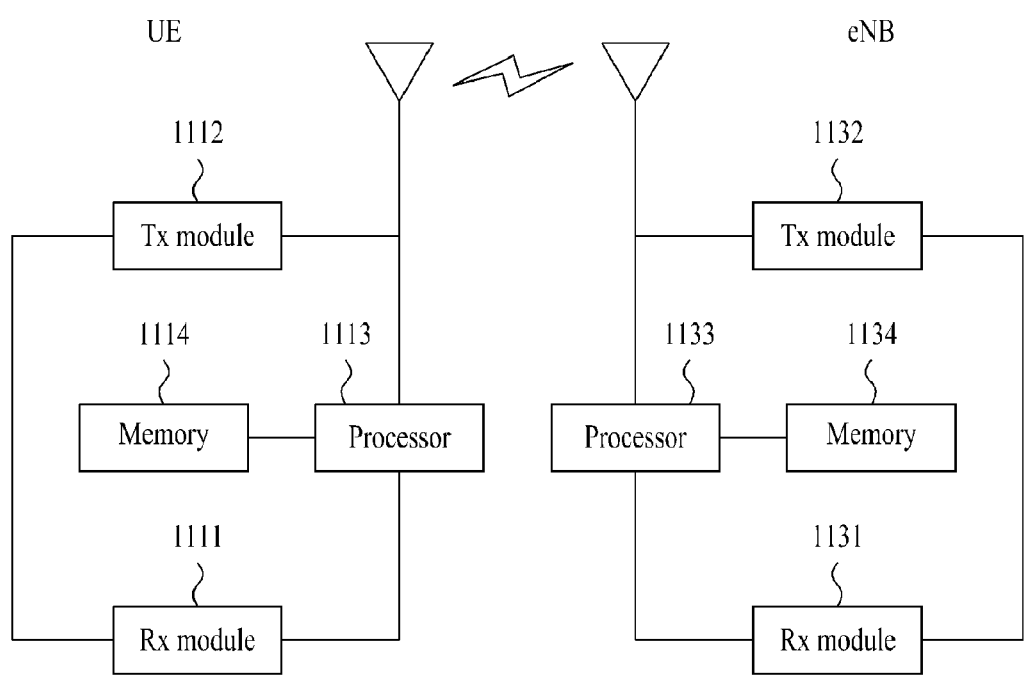
FIG. 17 is a view illustrating a wireless communication system including a UE device and an eNB device according to embodiments of the present invention.

FIG. 17 is a view illustrating a wireless communication system including a UE device and an eNB device according to embodiments of the present invention.

Referring to FIG. 17, the UE device may include a reception (Rx) module 1111, a transmission (Tx) module 1112, a processor 1113, and a memory 1114. The reception (Rx) module 1111 may receive various signals, data, information, etc. from the eNB or the like. The transmission (Tx) module 1112 may transmit various signals, data, information, etc. to the eNB or the like. The processor 1113 can control the quality measurement operation through the received measurement configuration information received through the Rx module 1111. In more detail, if the quality measurement result satisfies a quality measurement report criterion on the basis of a specific reference cell from among a plurality of UE-configured cells, the processor 1113 may report the report message including not only the quality measurement result but also an indicator indicating a specific reference cell to the network.

On the other hand, the eNB device may include a reception (Rx) module 1131, a transmission (Tx) module 1132, a processor 11330, and a memory 1134. The Rx module 1131 may receive various signals, data, information, etc. from the UE or the like. The Tx module 1132 may transmit various signals, data, information, etc. to the UE or the like.

The processor 1133 can control the Tx module 1132 to transmit configuration information of a specific CC from among a plurality of CCs, and can manage mobility of the corresponding UE through the measurement report message received from the UE. The processor 1133 may arithmetically perform processing of information received in the ABS, information to be transmitted externally, and the like. The memory 1134 may store arithmetically-processed information for a predetermined time, and be replaced with any other constituent element such as a buffer (not shown).

The processor 1113 and 1133 from among various constituent components of the UE and eNB devices will hereinafter be described in detail.

Figure 18:
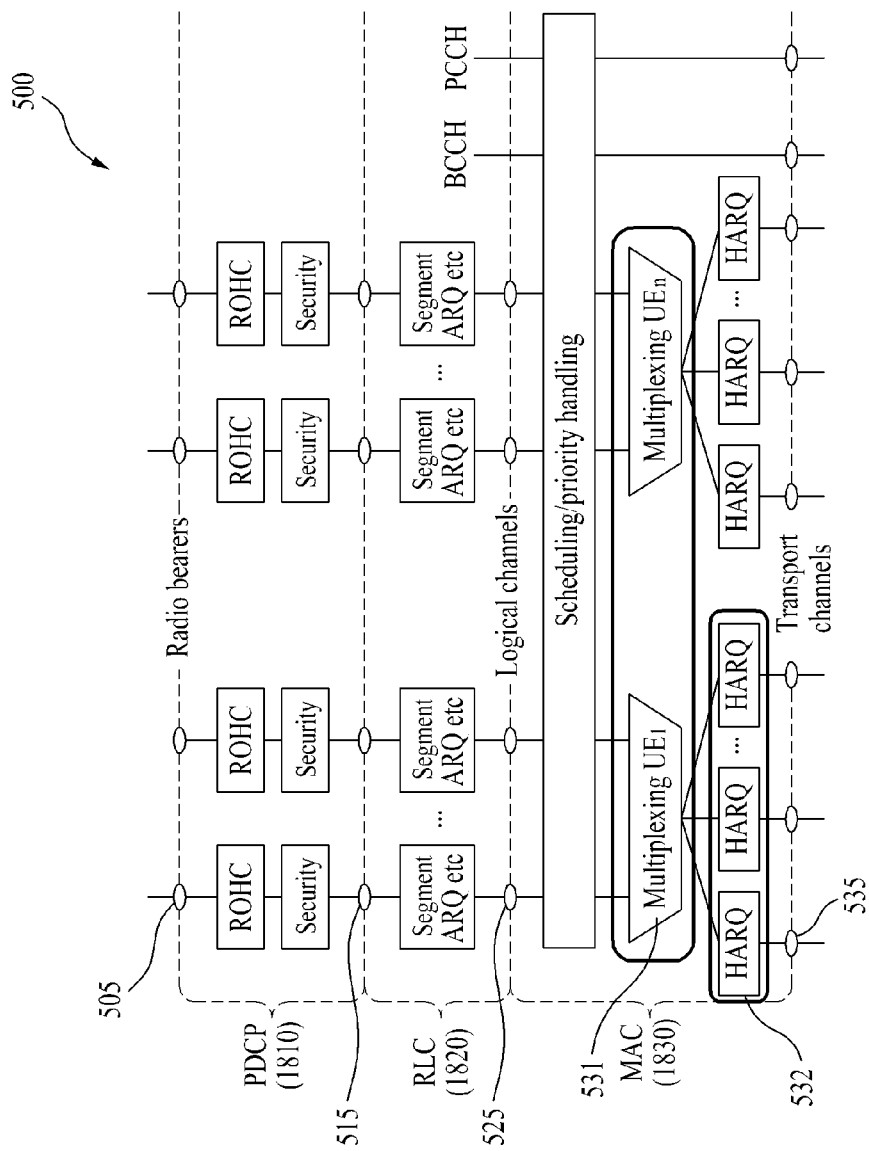
FIG. 18 illustrates the function of an eNB processor, especially an L2 (a second layer) structure, to which the exemplary embodiments of the present invention are applied.
Figure 19:
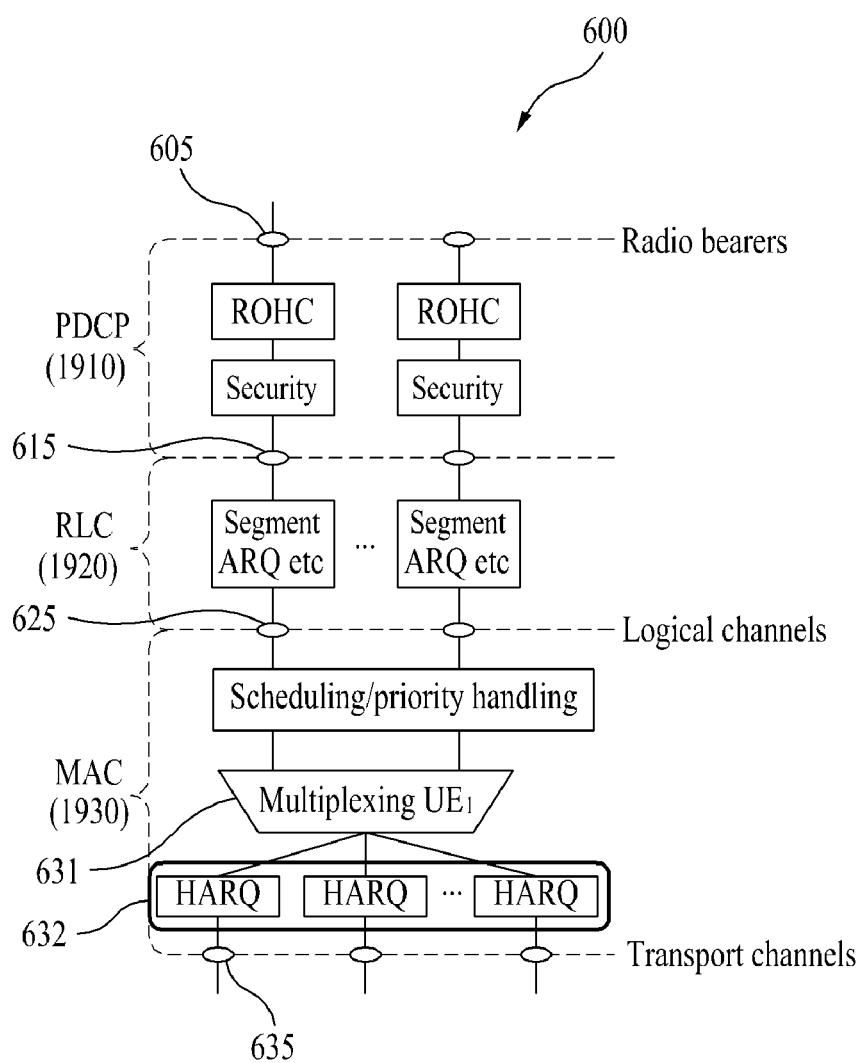
FIG. 19 illustrates the function of a UE processor, especially an L2 (a second layer) structure, to which the exemplary embodiments of the present invention are applied.

FIG. 18 illustrates the function of an eNB processor, especially an L2 (a second layer) structure, to which the exemplary embodiments of the present invention are applied. FIG. 19 illustrates the function of a UE processor, especially an L2 (a second layer) structure, to which the exemplary embodiments of the present invention are applied.

A downlink L2 structure 500 shown in FIG. 18 includes a PDCP layer 510, an RLC layer 520, and a MAC layer 530. In FIG. 18, elements (505, 515, 525, 535), each of which is denoted by a circle, for use in interface between individual layers indicate a service access point (SAP) for peer-to-peer communication. SAP between the PHY channel (not shown) and the MAC layer provides a transport channel 535, and SAP between the MAC layer and the RLC layer provides a logical channel 525. The general operations of respective layers are as follows.

In the MAC layer, a plurality of logical channels (i.e., radio bearers) from the RLC layer is multiplexed. In the downlink L2 structure, a plurality of multiplexing entities 531 of the MAC layer is associated with application of multiple input multiple output (MIMO) technology. In the case of non-MIMO for use in a system not based on the carrier aggregation (CA) technology, one transport channel is generated by multiplexing a plurality of logical channels, such that one hybrid automatic repeat and repeat entity (HARQ) entity (not shown) is provided to one multiplexing entity 531.

On the other hand, the eNB processor based on the CA technology generates a plurality of transport channels corresponding to a plurality of CCs from one multiplexing entity 531. In association with the above-mentioned technology, one HARQ entity 532 for use in the CA technology manages one CC. Therefore, the MAC layer 530 of the eNB processor supporting the CA technology provides a plurality of HARQ entities 532 to one multiplexing entity 531, and performs associated information. In addition, each HARQ entity 532 independently processes a transport block, such that it can simultaneously transmit and receive a plurality of transport blocks through a plurality of CCs.

In the uplink L2 structure 600 of FIG. 19, the remaining parts other than one multiplexing entity contained in one MCA layer 630 are identical in function to those of the downlink L2 structure 500. For a plurality of CCs, a plurality of HARQ entities 632 are provided, operations related to the plurality of HARQ entities 632 are carried out in the MAC layer 630, and a plurality of transport blocks can be simultaneously transmitted and received through a plurality of CCs.

The exemplary embodiment of the present invention of the present invention may be implemented by various means. For example, the exemplary embodiments of the present invention embodiment of the present invention may be implemented by hardware, firmware, software or a combination thereof.

When the method according to the exemplary embodiments of the present invention is implemented using hardware, one or more application specific integrated circuits (ASICs), digital signal processors (DSPs), digital signal processing devices (DSPDS), programmable logic devices (PLDs), field programmable gate arrays (FPGAs), processors, controllers, microprocessors, and the like may be employed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-mentioned embodiments have been disclosed on the basis of only the 3GPP LTE mobile communication system for convenience of description, the scope or spirit of the present invention is not limited thereto. That is, the above-mentioned embodiments can be applied to various mobile communication systems in which the measurement operation for UE mobility management is used and a UE can simultaneously use a plurality of CCs.

The invention claimed is:

1. A method of receiving a measurement report by a base station (BS) in a mobile communication system, the method comprising:
    transmitting, to a user equipment (UE), a radio resource control (RRC) message including information for configuring one or more second type serving cells in addition to a first type cell and a reporting criterion; and
    receiving a measurement report for at least one of the first type serving cell and the one or more second type serving cells, if a result of a cell measurement satisfies the reporting criterion,
    wherein the reporting criterion includes an A1 event in which a strength of a reference cell becomes greater than a first threshold,
    wherein the RRC message indicates that the reference cell for the A1 event is one of the first type serving cell or the one or more second type serving cells,
    wherein the reporting criterion further includes an A3 event in which a strength of a neighbor cell becomes offset from a strength of a predetermined serving cell by a predetermined offset value,
    wherein the predetermined serving cell is tied to the first type serving cell without any signaling,
    wherein the first type serving cell is able to be configured based on at least one of the A1 event or the A3 event, and
    wherein the second type serving cell is prohibited from being configured based on the A3 event.

2. The method of claim 1, wherein the first type serving cell is always activated and the one or more second type serving cells can be deactivated.

3. The method of claim 1, wherein the measurement report contains cell identity information only if the measurement report is related to the one or more second type serving cells.

4. The method of claim 1, wherein the reporting criterion further includes at least one of:
    an A2 event in which the strength of the reference cell becomes worse than a second threshold, the A2 being for one of the first type serving cell or the one or more second type serving cells;
    an A4 event in which the strength of the neighbor cell becomes better than a third threshold; or an A5 event in which the strength of the reference cell becomes worse than a fourth threshold and the strength of the neighbor cell becomes better than a fifth threshold, the A5 being for one of the first type serving cell or the one or more second type serving cells.

5. The method of claim 1, wherein the RRC message further includes information on a measurement object indicating at least one of an inter-frequency measurement and an intra-frequency measurement.

6. A non-transitory computer readable medium recorded thereon a program for executing the method of claim 1.

7. A base station (BS) comprising:
a radio frequency (RF) module configured to receive or transmit a radio frequency signal; and
a processor configured to control the RF module to:
transmit, to a user equipment (UE), a radio resource control (RRC) message including information for configuring one or more second type serving cells in addition to a first type cell and a reporting criterion; and
receive a measurement report for at least one of the first type serving cell and the one or more second type serving cells, if a result of a cell measurement satisfies the reporting criterion,
wherein the reporting criterion includes an A1 event in which a strength of a reference cell becomes greater than a first threshold,
wherein the RRC message indicates that the reference cell for the A1 event is one of the first type serving cell or the one or more second type serving cells,
wherein the reporting criterion further includes an A3 event in which a strength of a neighbor cell becomes offset from a strength of a predetermined serving cell by a predetermined offset value,
wherein the predetermined serving cell is tied to the first type serving cell without any signaling,
wherein the first type serving cell is able to be configured based on at least one of the A1 event or the A3 event, and
wherein the second type serving cell is prohibited from being configured based on the A3 event.

8. The BS of claim 7, wherein the first type serving cell is always activated and the one or more second type serving cells can be deactivated.

9. The BS of claim 7, wherein the measurement report contains cell identity information only if the measurement report is related to the one or more second type serving cells.

10. The BS of claim 7, wherein the reporting criterion further includes at least one of:
an A2 event in which the strength of the reference cell becomes worse than a second threshold, the A2 being for one of the first type serving cell or the one or more second type serving cells;
an A4 event in which the strength of the neighbor cell becomes better than a third threshold; or
an A5 event in which the strength of the reference cell becomes worse than a fourth threshold and the strength of the neighbor cell becomes better than a fifth threshold, the A5 being for one of the first type serving cell or the one or more second type serving cells.

11. The BS of claim 7, wherein the RRC message further includes information on a measurement object indicating at least one of an inter-frequency measurement and an intra-frequency measurement.

12. A method of transmitting a measurement report by a user equipment (UE) in a mobile communication system, the method comprising:
receiving, from a base station (BS), a radio resource control (RRC) message including information for configuring one or more second type serving cells in addition to a first type cell and a reporting criterion; and
transmitting a measurement report for at least one of the first type serving cell and the one or more second type serving cells, if a result of a cell measurement satisfies the reporting criterion,
wherein the reporting criterion includes an A1 event in which a strength of a reference cell becomes greater than a first threshold,
wherein the RRC message indicates that the reference cell for the A1 event is one of the first type serving cell or the one or more second type serving cells,
wherein the reporting criterion further includes an A3 event in which a strength of a neighbor cell becomes offset from a strength of a predetermined serving cell by a predetermined offset value,
wherein the predetermined serving cell is tied to the first type serving cell without any signaling,
wherein the first type serving cell is able to be configured based on at least one of the A1 event or the A3 event, and
wherein the second type serving cell is prohibited from being configured based on the A3 event.

13. A user equipment (UE) comprising:
a radio frequency (RF) module configured to receive or transmit a radio frequency signal; and
a processor configured to control the RF module to:
receive, from the BS, a radio resource control (RRC) message including information for configuring one or more second type serving cells in addition to a first type cell and a reporting criterion; and
transmit a measurement report for at least one of the first type serving cell and the one or more second type serving cells, if a result of a cell measurement satisfies the reporting criterion,
wherein the reporting criterion includes an A1 event in which a strength of a reference cell becomes greater than a first threshold,
wherein the RRC message indicates that the reference cell for the A1 event is one of the first type serving cell or the one or more second type serving cells,
wherein the reporting criterion includes an A3 event in which a strength of a neighbor cell becomes offset from a strength of a predetermined serving cell by a predetermined offset value,
wherein the predetermined serving cell is tied to the first type serving cell without any signaling,
wherein the first type serving cell is able to be configured based on at least one of the A1 event or the A3 event, and
wherein the second type serving cell is prohibited from being configured based on the A3 event.

* * * * *